US012586157B2

(12) United States Patent　　(10) Patent No.:　US 12,586,157 B2
Chung et al.　　　　　　　　　　(45) Date of Patent:　　Mar. 24, 2026

(54) METHODS AND SYSTEMS FOR MODIFYING HAIR CHARACTERISTICS IN A DIGITAL IMAGE

(71) Applicant: Ulta Salon, Cosmetics & Fragrance, Inc., Bolingbrook, IL (US)

(72) Inventors: Xin Chung, Bolingbrook, IL (US); Bruce V. Schwartz, Bolingbrook, IL (US); Giorgio Patrini, Bolingbrook, IL (US); Ajinkya Indulkar, Bolingbrook, IL (US); Ghassen Chaabouni, Bolingbrook, IL (US); Alberto Gaona, Bolingbrook, IL (US); Juan Cardelino, Montevideo (UY)

(73) Assignee: Ulta Salon, Cosmetics & Fragrance, Inc., Bolingbrook, IL (US)

( * ) Notice: Subject to any disclaimer, the term of this patent is extended or adjusted under 35 U.S.C. 154(b) by 270 days.

(21) Appl. No.: 18/332,861

(22) Filed: Jun. 12, 2023

(65) Prior Publication Data

US 2024/0412328 A1　　Dec. 12, 2024

(51) Int. Cl.
　G06T 5/50　　　(2006.01)
　G06T 5/73　　　(2024.01)
　(Continued)

(52) U.S. Cl.
　CPC .................. G06T 5/50 (2013.01); G06T 5/73 (2024.01); G06T 5/77 (2024.01); G06T 7/194 (2017.01);
　(Continued)

(58) Field of Classification Search
　CPC . G06T 5/50; G06T 7/194; G06T 2207/20084;
　　　　　　　　　　　　　　　G06T 2207/20212;
　(Continued)

(56) References Cited

U.S. PATENT DOCUMENTS 6,453,052 B1　　9/2002　Kurokawa et al.
8,055,011 B2　　11/2011　Ikeda et al.
(Continued)

OTHER PUBLICATIONS

"Transformer-Based GAN for New Hairstyle Generative Networks." Man et al. MDPI Electronics 2022, 11, 2106. https://doi.org/10.3390/electronics11132106. (Year: 2022).*
(Continued)

*Primary Examiner* — Antonio A Caschera
(74) *Attorney, Agent, or Firm* — McDonnell Boehnen Hulbert & Berghoff LLP

(57)　　　　　　ABSTRACT

An example computer-implemented image processing method includes receiving a digital image including a face area of a person and a background area, receiving an input parameter for modification of a feature of hair on the person, modifying the digital image based on the input parameter utilizing a generative neural network to create a modified digital image in which the feature of the hair on the person is modified, extracting a hair area from the modified digital image, and the face area and the background area from the digital image, and combining the face area and the background area from the digital image with the hair area from the modified digital image to create a composite modified digital image that includes data representing a modified feature of hair on the person from the modified digital image and data representing the face area and the background area from the digital image.

20 Claims, 14 Drawing Sheets

(51) Int. Cl.

| | |
|---|---|
| *G06T 5/77* | (2024.01) |
| *G06T 7/194* | (2017.01) |
| *G06T 11/10* | (2026.01) |
| *G06V 10/82* | (2022.01) |
| *G06V 40/16* | (2022.01) |

(52) U.S. Cl.
CPC .............. *G06T 11/10* (2026.01); *G06V 10/82* (2022.01); *G06V 40/162* (2022.01); *G06T 2207/10024* (2013.01); *G06T 2207/20021* (2013.01); *G06T 2207/20084* (2013.01); *G06T 2207/20212* (2013.01); *G06T 2207/30201* (2013.01)

(58) Field of Classification Search
CPC .......... G06T 2207/30201; G06V 10/82; G06V 40/162; G06N 3/0475
See application file for complete search history.

(56) References Cited

U.S. PATENT DOCUMENTS

| | | | |
|---|---|---|---|
| 8,884,980 | B2 | 11/2014 | Mallick et al. |
| 9,367,940 | B2 | 6/2016 | Wang et al. |
| 9,928,601 | B2 | 3/2018 | Aarabi |
| 10,217,244 | B2 | 2/2019 | Kowalczyk et al. |
| 10,402,689 | B1* | 9/2019 | Bogdanovych ...... G06V 30/242 |
| 10,762,665 | B2 | 9/2020 | Kuo |
| 10,825,219 | B2 | 11/2020 | Fu et al. |
| 10,849,408 | B2 | 12/2020 | Skwarek |
| 11,093,733 | B2 | 8/2021 | Yuan et al. |
| 2020/0015155 | A1 | 1/2020 | Wakabayashi |
| 2020/0027944 | A1 | 1/2020 | Xuan et al. |
| 2022/0010157 | A1 | 1/2022 | Burtovyy et al. |
| 2022/0101577 | A1* | 3/2022 | Chakrabarty ............. G06T 7/11 |
| 2022/0284646 | A1* | 9/2022 | Saha ......................... G06T 5/50 |
| 2023/0124252 | A1* | 4/2023 | Liu .......................... G06T 11/00 |
| | | | 345/589 |
| 2024/0135561 | A1* | 4/2024 | Ding ...................... G06V 10/26 |
| 2024/0331094 | A1* | 10/2024 | Pouyanfar ................ G06T 5/60 |

OTHER PUBLICATIONS

Azmarie Wang, Hairstyle Transfer—Semantic Editing GAN Latent Code, May 24, 2020, retrieved from the internet at: https://medium.com/swlh/hairstyle-transfer-semantic-editing-gan-latent-code-b3a6ccf91e82.

Peihao Zhu et al, "Barbershop: GAN-based Image Compositing using Segmentation Masks:", Oct. 16, 2021, retrieved from the internet at: https://arxiv.org/pdf/2106.01505.pdf.

* cited by examiner

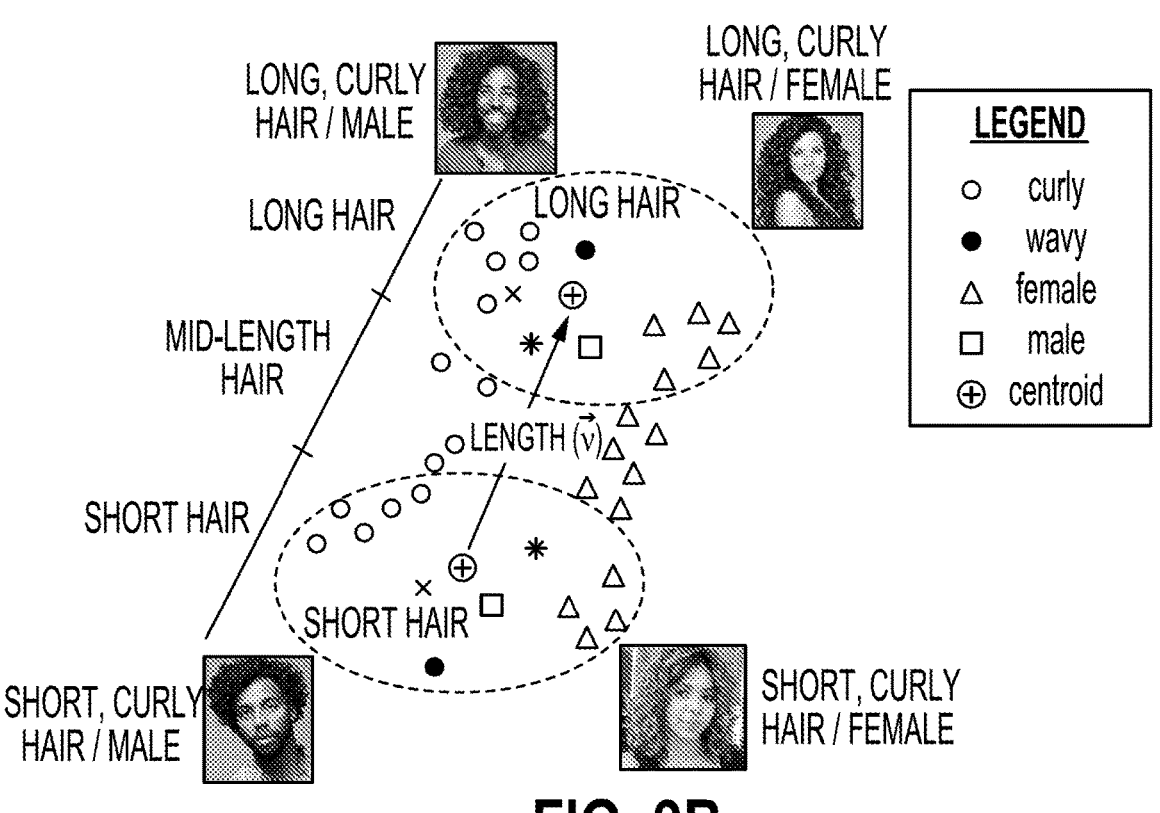

FIG. 9B

LONG, CURLY HAIR / MALE

LONG, CURLY HAIR / FEMALE

LONG HAIR

MID-LENGTH HAIR

SHORT HAIR

LONG HAIR

LENGTH $(\vec{v})$

SHORT HAIR

SHORT, CURLY HAIR / MALE

SHORT, CURLY HAIR / FEMALE

LEGEND
- ○ curly
- ● wavy
- △ female
- □ male
- ⊕ centroid

LONG, CURLY HAIR / MALE

LONG, CURLY HAIR / FEMALE

LONG HAIR

LENGTH FOR MALES $(\vec{v_2})$ $X_i^2$

LENGTH $(\vec{v})$

SHORT HAIR

LENGTH FOR FEMALES $(\vec{v_1})$ $X_i^1$

GENERIC PROJECTION $X_0 = X_i + \alpha \vec{v}$ $X_0$ $(\vec{v})$ $X_i^1$ $\alpha$

INPUT IMAGE

SHORT, CURLY HAIR / MALE

SHORT, CURLY HAIR / FEMALE

LEGEND
- ○ curly
- ● wavy
- △ female
- □ male
- ⊕ centroid

FIG. 9C

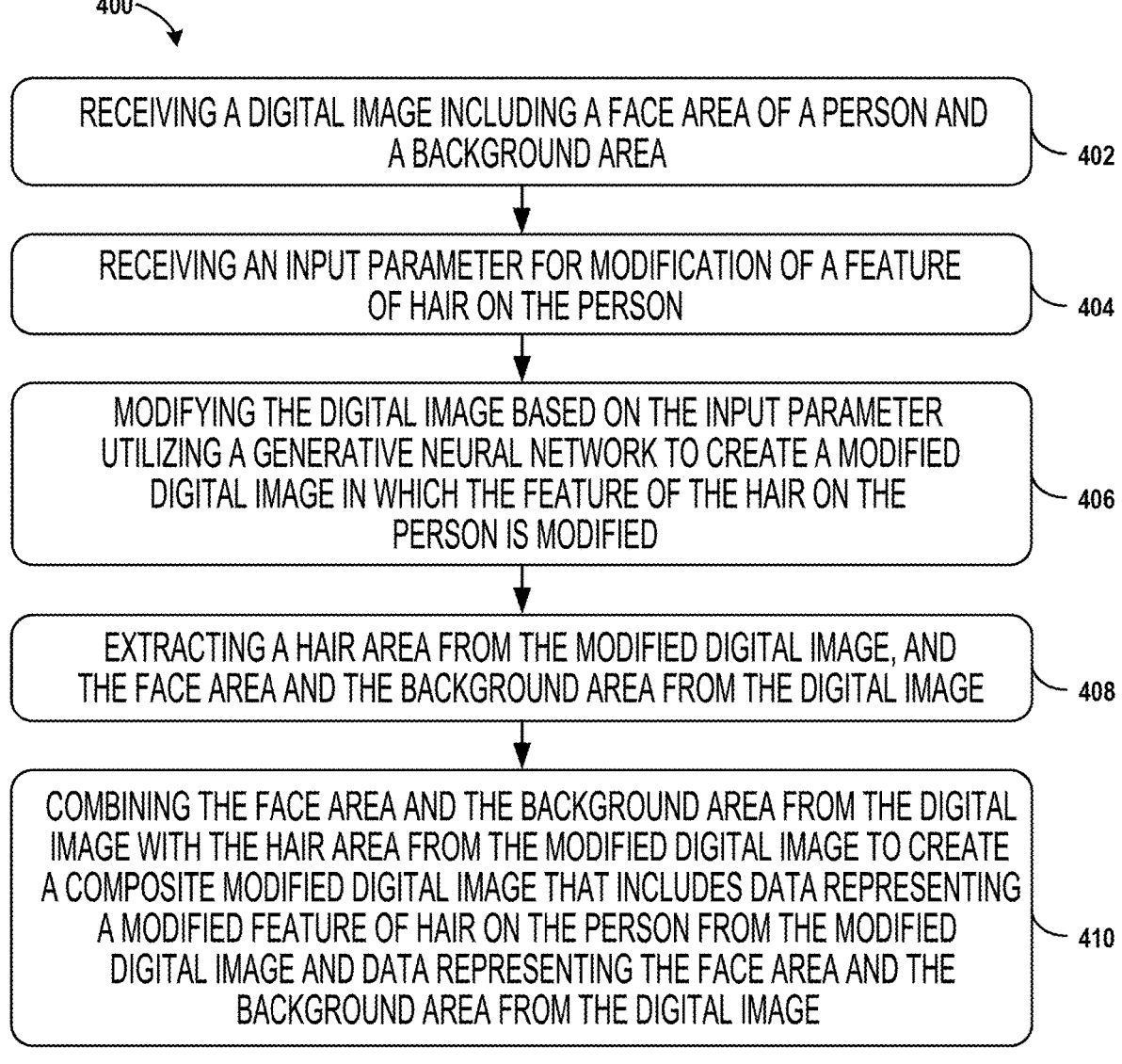

400

RECEIVING A DIGITAL IMAGE INCLUDING A FACE AREA OF A PERSON AND A BACKGROUND AREA — 402

RECEIVING AN INPUT PARAMETER FOR MODIFICATION OF A FEATURE OF HAIR ON THE PERSON — 404

MODIFYING THE DIGITAL IMAGE BASED ON THE INPUT PARAMETER UTILIZING A GENERATIVE NEURAL NETWORK TO CREATE A MODIFIED DIGITAL IMAGE IN WHICH THE FEATURE OF THE HAIR ON THE PERSON IS MODIFIED — 406

EXTRACTING A HAIR AREA FROM THE MODIFIED DIGITAL IMAGE, AND THE FACE AREA AND THE BACKGROUND AREA FROM THE DIGITAL IMAGE — 408

COMBINING THE FACE AREA AND THE BACKGROUND AREA FROM THE DIGITAL IMAGE WITH THE HAIR AREA FROM THE MODIFIED DIGITAL IMAGE TO CREATE A COMPOSITE MODIFIED DIGITAL IMAGE THAT INCLUDES DATA REPRESENTING A MODIFIED FEATURE OF HAIR ON THE PERSON FROM THE MODIFIED DIGITAL IMAGE AND DATA REPRESENTING THE FACE AREA AND THE BACKGROUND AREA FROM THE DIGITAL IMAGE — 410

FIG. 20

METHODS AND SYSTEMS FOR MODIFYING HAIR CHARACTERISTICS IN A DIGITAL IMAGE

FIELD

The present disclosure relates generally to methods and systems for modifying hair characteristics in a digital image, and more particularly, to a computer-implemented image processing method for utilizing a generative neural network to create a modified digital image in which a feature of hair on a person is modified and recombining a face area and a background area from an original digital image with the hair area from the modified digital image to create a composite modified digital image.

BACKGROUND

A hairstyle, and facial hair in general, is an important part of personal appearance and is expressive of personality and overall style. Being able to virtually "try on" different hairstyles through a computer vision system would be very beneficial, for example, to avoid costly services.

However, current methods for editing hair characteristics in an image typically do not result in photorealistic output images, or an identity of a person is not satisfactorily preserved when editing hair characteristics.

SUMMARY

Within examples, a computer-implemented tool is described that uses machine learning, in some aspects, to modify features in a digital image of a person (e.g., such as features of hair on a person) to enable a virtual try-on of new hair features on the person.

In one example, a computer-implemented image processing method is described, which includes receiving a digital image including a face area of a person and a background area, receiving an input parameter for modification of a feature of hair on the person, modifying the digital image based on the input parameter utilizing a generative neural network to create a modified digital image in which the feature of the hair on the person is modified, extracting a hair area from the modified digital image, and the face area and the background area from the digital image, and combining the face area and the background area from the digital image with the hair area from the modified digital image to create a composite modified digital image that includes data representing a modified feature of hair on the person from the modified digital image and data representing the face area and the background area from the digital image.

In another example, a non-transitory computer-readable media having stored therein executable instructions, which when executed by a system including one or more processors causes the system to perform functions is described. The functions comprise receiving a digital image including a face area of a person and a background area, receiving an input parameter for modification of a feature of hair on the person, modifying the digital image based on the input parameter utilizing a generative neural network to create a modified digital image in which the feature of the hair on the person is modified, extracting a hair area from the modified digital image, and the face area and the background area from the digital image, and combining the face area and the background area from the digital image with the hair area from the modified digital image to create a composite modified digital image that includes data representing a modified feature of hair on the person from the modified digital image and data representing the face area and the background area from the digital image.

In still another example, a system is described comprising one or more processors and non-transitory computer-readable media having stored therein instructions, which when executed by the one or more processors, causes the system to perform functions. The functions comprise receiving a digital image including a face area of a person and a background area, receiving an input parameter for modification of a feature of hair on the person, modifying the digital image based on the input parameter utilizing a generative neural network to create a modified digital image in which the feature of the hair on the person is modified, extracting a hair area from the modified digital image, and the face area and the background area from the digital image, and combining the face area and the background area from the digital image with the hair area from the modified digital image to create a composite modified digital image that includes data representing a modified feature of hair on the person from the modified digital image and data representing the face area and the background area from the digital image.

The features, functions, and advantages that have been discussed can be achieved independently in various examples or may be combined in yet other examples. Further details of the examples can be seen with reference to the following description and drawings.

BRIEF DESCRIPTION OF THE FIGURES

Examples, objectives and descriptions of the present disclosure will be readily understood by reference to the following detailed description of illustrative examples when read in conjunction with the accompanying drawings, wherein:

FIG. 9B is a conceptual illustration of a latent space representation of images and determination of a length vector, according to an example implementation.

FIG. 9C is another conceptual illustration of the latent space representation of images and projection of an input image along a latent direction code, according to an example implementation.

FIG. 20 is a flowchart illustrating an example of a computer-implemented image processing method, according to an example implementation.

DETAILED DESCRIPTION

Figure 1:
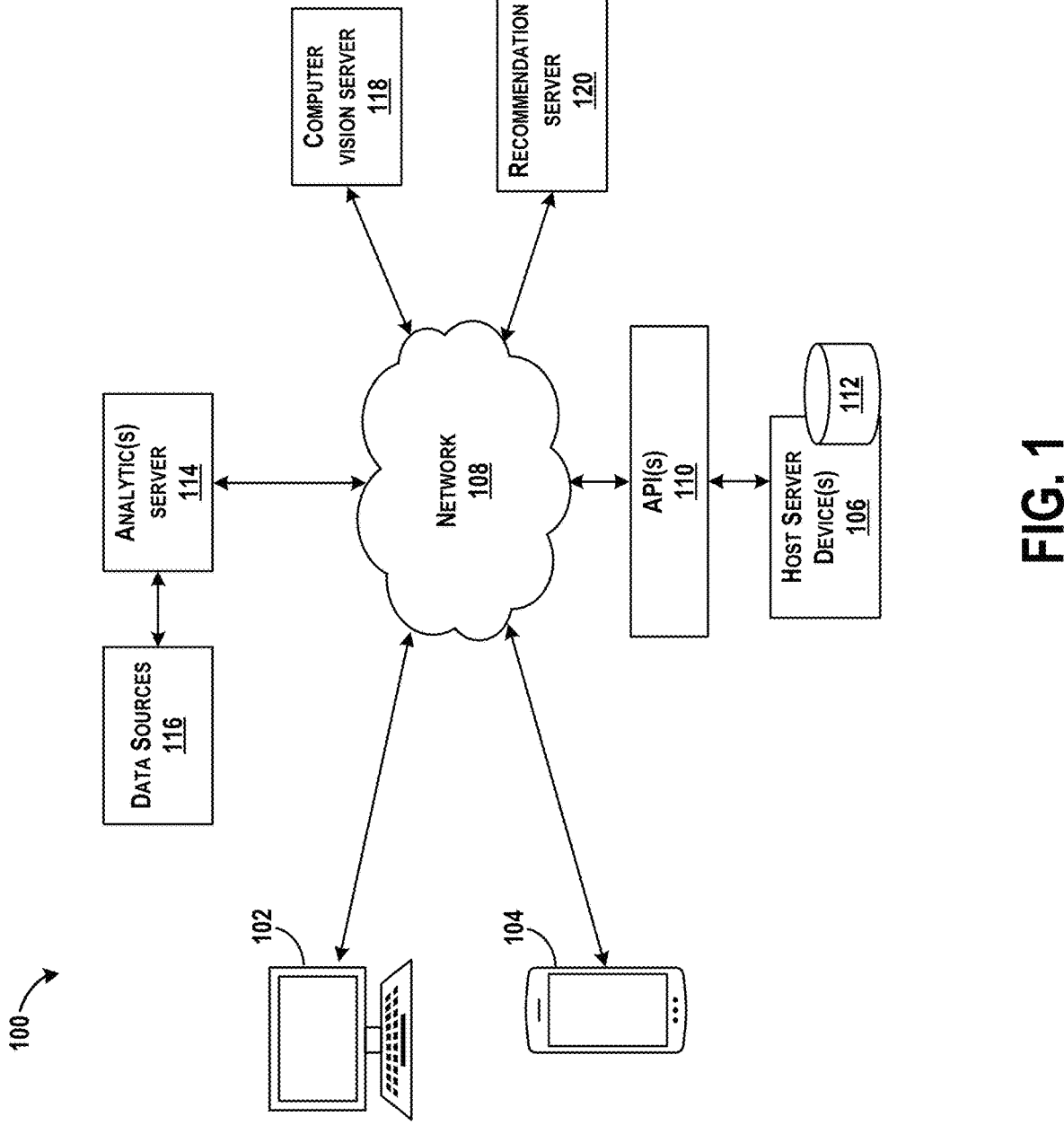
FIG. 1 is a block diagram illustrating an example of a networked computer system, according to an example implementation.

Disclosed examples will now be described more fully hereinafter with reference to the accompanying drawings. Several different examples are described and should not be construed as limited to all possible alternatives. Rather, these examples are described so that this disclosure is thorough and complete and fully conveys a scope of the disclosure to those skilled in the art.

Within examples, systems and methods described herein are beneficial to modify images and show how a person would look if they were to change their hair characteristics, such as increasing or decreasing hair volume or length, by use of a computer generated image. Example methods allow a person to virtually try-on variations of hairstyle or variations of modifications to hair on their face (e.g., beard, mustache, eyebrows, etc.) and generate a new photorealistic output image by modifying the hairstyle of the person's selfie with the new chosen hair characteristics.

Example methods require an image of the person, and inputs for what hair to modify and how to modify the hair (e.g., volume, length . . . , and strength of modification such as low, mid and high). The image and inputs are fed into a generative neural network (e.g., such as a generative adversarial network (GAN)) to generate an output image with the chosen "Mods". Face swap and inpainting are further applied to the modified image to improve fidelity and to preserve identity of the person in the image.

The systems and methods described herein provide technological improvements that are particular to computer technology, for example, those concerning computer vision, computer graphical representation, and image processing. Computer-specific technological problems, such as modifying a digital image, can be wholly or partially solved by implementations of this disclosure. For example, implementation of this disclosure allows for many types of media (including both visual and non-visual) that is indicative of or includes a face of a person to be modified according to inputs so as to identify a face area and a background area, and then to modify hair on the face area according to received inputs. Processing includes using a generative neural network to modify the image, and then extracting a face area of an original image to use for combination with the modify image in order to preserve identity of the person.

Implementations of this disclosure thus introduce new and efficient improvements in the ways in which image processing is offered to perform custom modifications to hair that take into photorealistic features, as well as, processing speed. The image processing utilizes an end-to-end pipeline that performs modifications of the image via execution of a generative neural network in one iteration, thus, reducing time to generate a modified output image.

The systems and methods of the present disclosure further address problems particular to computer networks, for example, those concerning processing of visual media (including a face of a user) across multiple computers or through use of neural networks. These computing network-specific issues can be solved by implementations of the present disclosure. For example, in an instance where a user consents to use of the visual media including the face of the user, such data may be used for performing modifications to the image through machine learning algorithms executed by computer networks. In any situations in which systems described herein collect personal information about users, or process information to generate personal information of user, the users may be provided with opportunities to control whether the systems proceed to collect the user information. In addition, some user data may be processed before stored or used so that personally identifiable information is removed. Furthermore, in some examples, a user has further capabilities to request for deletion of user data at any time.

Referring now to the figures, FIG. 1 is a block diagram illustrating an example of a networked computer system 100, according to an example implementation. The networked computer system 100 includes one or more client devices 102 and 104 coupled to one or more host server device(s) 106 via a network 108. The network 108 represents one or more (or any combination of) local area networks (LANs), wide area networks (WANs), cellular networks, and/or other networks using any of wired, wireless, terrestrial microwave, or satellite links, and may include the public Internet or a private Intranet.

Within examples, the client devices 102 and 104 are one of a special purpose data processor, a general-purpose computer, smartphone, tablet, a computer system, or a group of networked computers or computer systems configured to perform steps or modes of methods described herein. Further examples of the client devices 102 and 104 may include, without limitation, handheld computers, wearable devices, laptop computers, desktop computers, servers, portable media players, gaming devices, in-store kiosks, and so forth. According to one example, the client devices 102 and 104 are built on a personal computer platform, such as the Apple® or Android® platform. Although FIG. 1 illustrates two of the client devices 102 and 104, the networked computer system may include fewer or more of the client devices 102 and 104 operating at any time.

The host server devices(s) 106 may include any number of computers, virtual machine instances, and/or data centers that are configured to host or execute one or more instances of host applications. The host server devices(s) 106 may be involved, directly or indirectly, in processing requests received from the client devices 102 and 104. The host server devices(s) 106 comprise, for example, one or more of a network device, a web server, an application server, a database server, etc. A collection of the host server devices(s) 106 may be configured to implement a network-based service. For example, a provider of a network-based service configures one or more of the host server devices(s) 106 and host applications (e.g., one or more web servers, application servers, database servers, etc.) to collectively implement a network-based application.

The client devices 102 and 104 communicate with one or more host applications at the host server devices(s) 106 to exchange information. The communication between the client devices 102 and 104 and a host application, for example, is based on the Hypertext Transfer Protocol (HTTP) or any other network protocol. Content delivered from the host application to the client devices 102 and 104 includes, for example, HTML documents, media content, etc. The communication between the client devices 102 and 104 and a host application includes sending various requests and receiving data packets. For example, the client devices 102 and 104 or an application running on the client devices 102 and 104 initiate communication with a host application by making a request for a specific resource (e.g., based on an HTTP request), and the host server devices(s) 106 respond with the requested content stored in one or more response packets.

Thus, one or more client applications may be executed at the client devices 102 and 104. Some applications executing at the client devices 102 and 104 may implement one or more application programming interfaces (APIs) 110. The APIs 110, for example, process inputs and control outputs of the client devices 102 and 104. For example, a client application executing at the client devices 102 and 104 accesses the host server device(s) 106 via the API 110 to retrieve configuration parameters for a particular requested image processing platform that performs functions, such as, hair modification of a person in a digital image. The client application then uses local image processing libraries along with retrieved configuration parameters to generate visual media in response to a request by the host server device(s) 106.

The APIs 110 serve as an interface between the client devices 102 and 104 and the host server device(s) 106. One or more repositories and/or databases 112, which support certain utilities, store content required for implementing the image processing platform described herein, and is accessible by the host server device(s) 106. For example, the databases 112 store host applications, content (e.g., images/video), data related to image processing (e.g., image processing libraries, computer graphics, predefined visual effects, etc.), information relevant to the users (e.g., registration information or usage statistics), metadata, and any other data used in implementing the techniques described herein.

Thus, in some examples, techniques described herein are provided by an image processing platform that is made accessible via a website or an application via the API 110. Alternatively, or in addition, techniques described herein are offered as a platform product directly implementable on various devices or systems.

The networked computer system 100 also includes an analytic(s) server 114. The analytic(s) server 114 performs analytics on data related to usage behavior of the networked computer system 100. Such analytics may support other services including product recommendations and targeted marketing.

The networked computer system 100 also includes one or more data sources 116 accessible by the analytic(s) server 114. The data sources 116 generally refer to any sources from which data is received to implement features described herein. As a few illustrative examples, the data sources 116 include makeup product vendors, manufacturers, retailers, etc., content providers/licensing services, modeling services, and machine generated data sources such as server log files, activity log files, configuration files, messages, network packet data, performance measurements, sensor measurements, and the like.

The networked computer system 100 also includes a computer vision server 118. The computer vision server 118 is in communication with the client devices 102 and 104 and the host server device(s) 106 via the network 108 to receive visual media such as a digital image or digital video including a face, a body, or a portion of a face or body of a user, and processes the visual media to generate information for a number of different image processing functions. Within examples, the visual media includes one or more of a digital image, multiple frames of images, video, etc. Within some examples, the images include visible images (red, green, blue color images), and in other examples the images include multi or hyperspectral images (such as infrared images).

The computer vision server 118 includes computational ability to perform computer vision tasks for identifying and localizing a face in an image (e.g., using any number of algorithms such as the classical feature-based cascade classifier using the OpenCV library or a Multi-task Cascade convolutional neural network (MTCNN) via the MTCNN library) to find coordinates of the face in the image or demarcating an extent of the face (e.g., with a bounding box). Following, the computer vision server 118 identifies landmarks and regions on the face (e.g., nose, eyes, lips, etc.) as well as landmarks of other features in the image include area identified as hair on the face or on a head of the person through any number of algorithms or through use of pre-trained models in a machine learning algorithm. The computer vision server 118 then outputs, to the host server device(s) 106 and/or to the client devices 102 and 104, information for each identified component of the image.

The networked computer system 100 also includes a recommendation server 120. The recommendation server 120 can include or have access to a database containing product information, beauty services information, etc., which is accessible via the network 108 by the host server device(s) 106. The host server device(s) 106 then uses information from the output of the computer vision server 118 to select or receive an applicable product, entity, or service from the recommendation server 120 that would be applicable to features of the user detected in the visual media.

Figure 2:
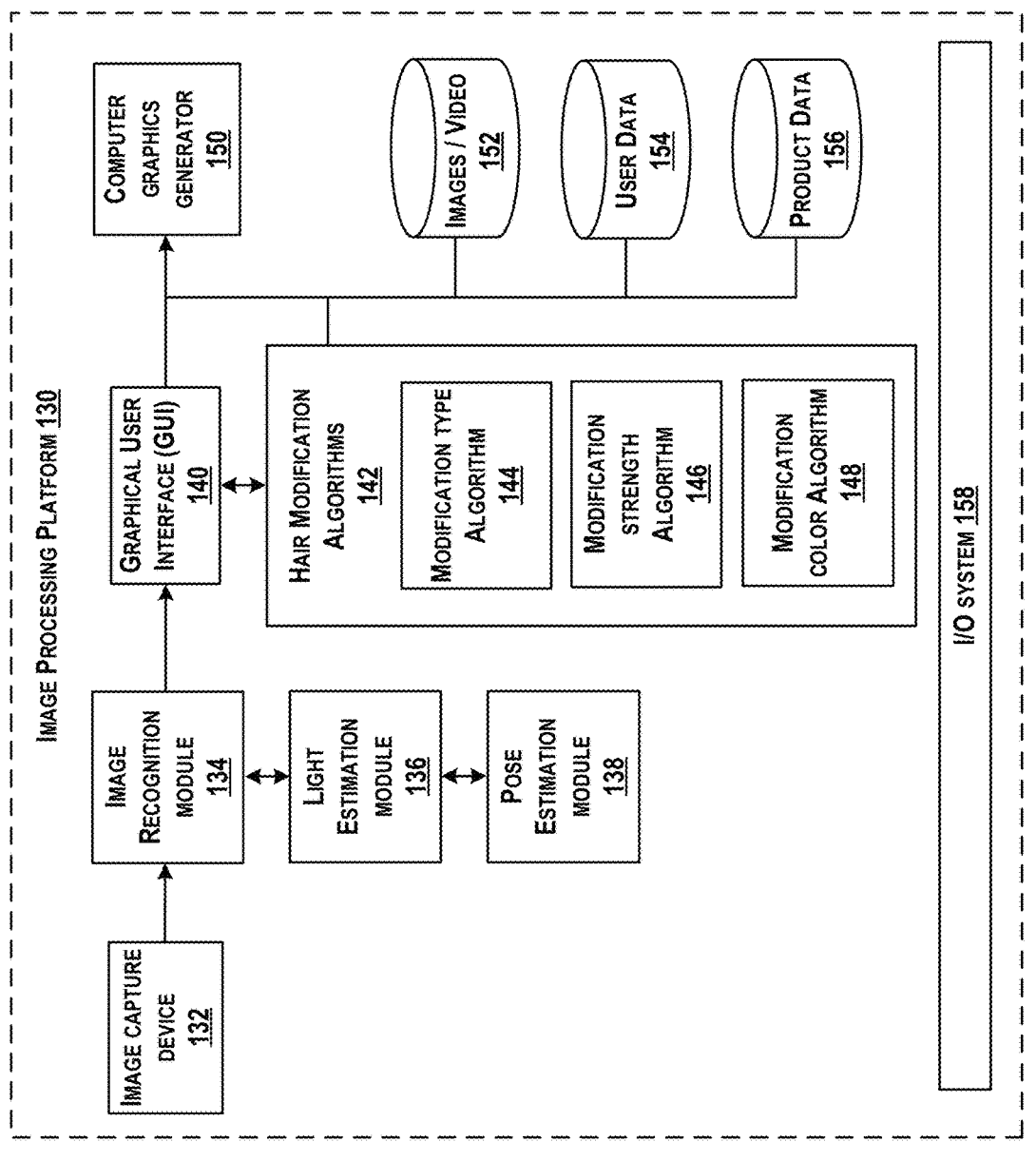
FIG. 2 illustrates a block diagram of an image processing platform, according to an example implementation.

FIG. 2 illustrates a block diagram of an image processing platform 130, according to an example implementation. Within examples, some or all of the components of the networked computer system 100 perform some functions of the image processing platform 130. Depending upon a particular implementation, various components described with respect to FIG. 2 are implemented at a single computing device (e.g., the host server device(s) 106 or one of the client devices 102 and 104) or distributed across several computing devices or servers. In some examples, certain functionalities of the image processing platform 130 (e.g., image capture) are performed at one of the client devices 102 and 104 while other functionalities (e.g., image recognition) are performed at a remote server device, such as the computer vision server 118.

Figures 3, 4:
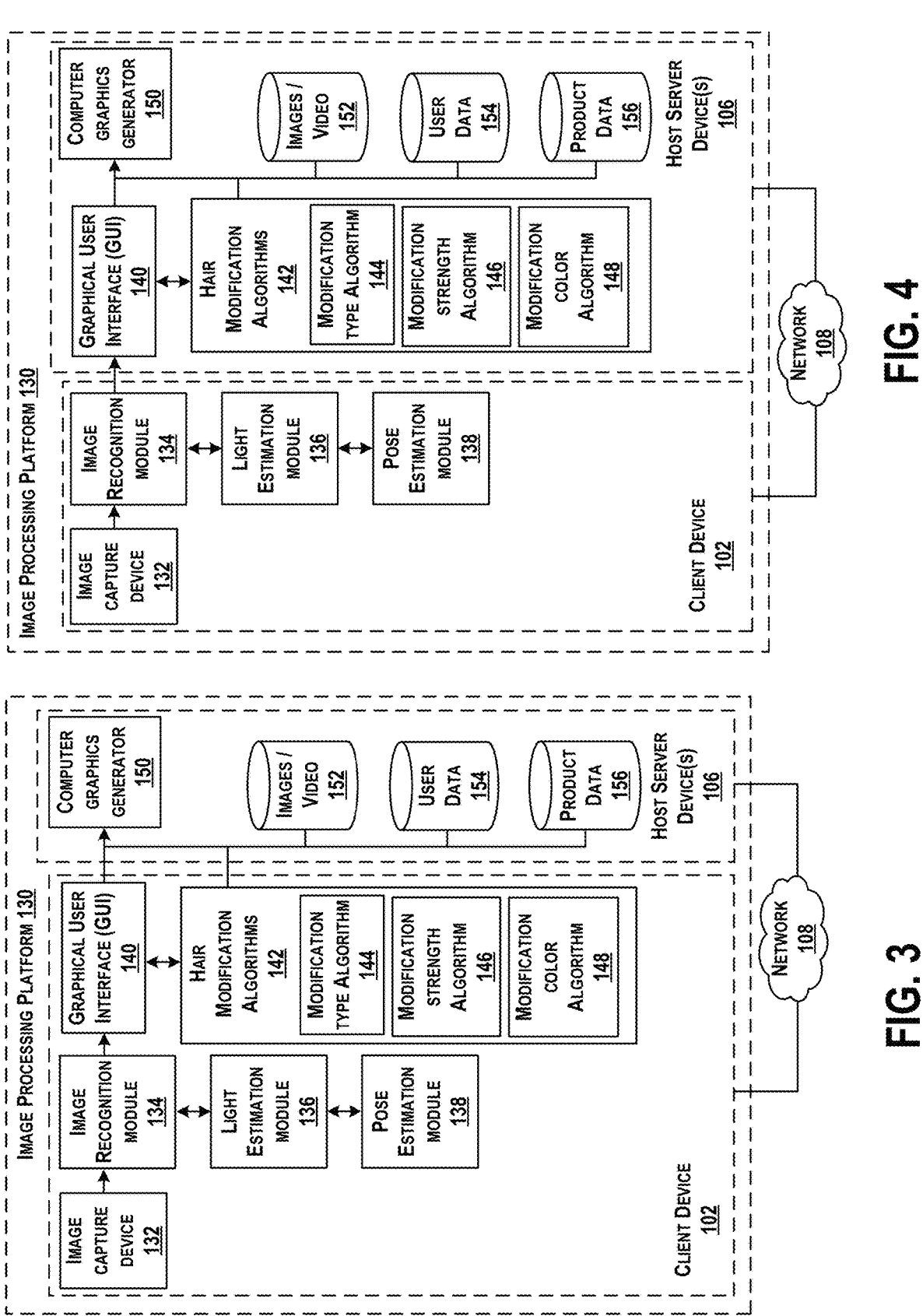
FIG. 3 illustrates a block diagram of an example implementation of the image processing platform, according to an example implementation.
FIG. 4 illustrates a block diagram of another example implementation of the image processing platform, according to an example implementation.

FIG. 3 illustrates a block diagram of an example implementation of the image processing platform 130, according to an example implementation, in which some components described with respect to FIG. 2 are instantiated at the client devices 102 and some components are instantiated at the host server device(s) 106, and in which the client device 102 and the host server device(s) are communicatively coupled via the network 108.

FIG. 4 illustrates a block diagram of another example implementation of the image processing platform 130, according to an example implementation, in which other components described with respect to FIG. 2 are instantiated at the client devices 102 and other components are instantiated at the host server device(s) 106, and in which the client device 102 and the host server device(s) are communicatively coupled via the network 108.

The example implementations shown in FIGS. 3 and 4 are provided for illustrative purposes only, and components of the image processing platform 130 are be distributed differently in other examples.

With reference to FIGS. 2-4, some components are described as "modules", "engines", or "generators", and such components include general purpose or special purpose hardware (e.g., general or special purpose processors), firmware, and/or software embodied in a non-transitory computer-readable (storage) medium for execution by one or more processors to perform described functionality.

The image processing platform 130 includes an image capture device 132 in a form of software and/or hardware for capturing media (images and/or video) at one of the client devices 102 and 104. For example, the image capture device 132 includes a digital camera including one or more optical sensors (e.g., charge-coupled devices (CCD), complementary metal-oxide semiconductor (CMOS) phototransistors, etc.) for conversion of received light to visual media such as digital information. In another example, the image capture device 132 includes software for pre-processing raw image data.

Within examples, the image processing platform 130 enables capture of many different kinds of media that includes or is indicative of a person and a face of a person. One type includes visual media, such as a single digital image, multiple digital images, and videos. Other types include non-visual media, such as infrared (IR) images or data, and hyperspectral images or data. Still other types of media include media captured based on the visible light spectrum or other spectral bands such as ultra-violet (UV). A number of media captured and a type of media captured depends on image capture sensors or devices available or included on the client devices 102 and 104. In examples where non-visual media is captured, such data is useful for further analysis of features included in media, such as features of a face to determine contours and other three-dimensional (3D) aspects.

An image recognition module 134 receives or retrieves the visual media (e.g., digital image) including a face area of a person and a background area from the image capture device 132, and processes the visual media to perform functions that may include: first, determining if a face is present or not; second, detecting a bounding box of the face; third performing detection of the facial features; and finally performing pre-processing of the digital image for at least one of aligning, cropping, and resizing the digital image.

The image processing platform 130 further includes a light estimation module 136 to evaluate one or more characteristics of illumination for the visual media. Based on the one or more characteristics of illumination for the visual media not meeting a quality level, the light estimation module 136 requests a new visual media including the face of the user with an adjustment to lighting in an environment of the user.

The image processing platform 130 further includes a pose estimation module 138 to evaluate one or more characteristics of a pose of the face of the user in the visual media. Based on the one or more characteristics of the pose of the face of the user in the visual media indicating a threshold amount of the face of the user is not included in the visual media, the pose estimation module 138 requests the user to adjust a position of the face for capture of new visual media.

The image processing platform 130 further includes a graphical user interface (GUI) 140 that allows users to interact with the client devices 102 and 104 through graphical icons and audio indicators, typed command labels or text navigation. The GUI 140 includes interactive elements selectable for providing input by a user or receiving outputs by the GUI 140. The GUI 140 operates to provide information based on hair modification algorithms 142 executable to identify and/or modify a feature of hair on the person in a digital image. The hair modification algorithms 142 include a modification type algorithm 144, a modification strength algorithm 146, and a modification color algorithm 148. More or fewer hair modification algorithms 142 may be included as well. Details of each of the hair modification algorithms 142 are discussed more fully below.

The hair modification platform 130 further includes a computer graphics generator 150 to generate or select computer graphics applicable for display by the GUI 140 to be representative of modifications to hair on the person in the digital image and/or to be representative of other features for inclusion within an output composite image. Within one example, the GUI 140 is operated to overlay or combine computer graphics output by the computer graphics generator 150 at locations onto the visual media including the face of the user corresponding to areas for modification of hair on the person, or at locations onto the visual media including a body of the user corresponding to modifications of clothing on the person.

The hair modification platform 130 further includes or has access to databases such as an images/video database 152 that stores the visual media received according to permissions set by the user, a user data database 154 that stores user data (e.g., age, preferences, goals, past purchases, navigation history, etc.) according to permissions set by the user, and a product data database 156 that stores details of products.

In some examples, when permissions are set accordingly by the user, the image recognition module 134 is operated to retrieve visual media including a face area of a person from the images/video database 152 (rather than receiving a digital image in real-time or substantially real-time from the image capture device 132) for access to pre-existing visual media to process accordingly.

The hair modification platform 130 further includes an input/output (I/O) system 158 that couples components of the hair modification platform 130 to input and output devices of any type. For example, for components of the hair modification platform 130 that are instantiated at one of the client devices 102 and 104, the I/O system 158 couples to a touch screen display device through which outputs are displayed and user inputs (e.g., touch gestures) are received, the image capture device 132 through which image data is received, and/or a network device through which data is transmitted/received over the network 108. Similarly, for components of the hair modification platform 130 that are instantiated at the host server device(s) 106, the I/O system 158 couples to a network device through which data is transmitted/received over the network 108.

Figure 5:
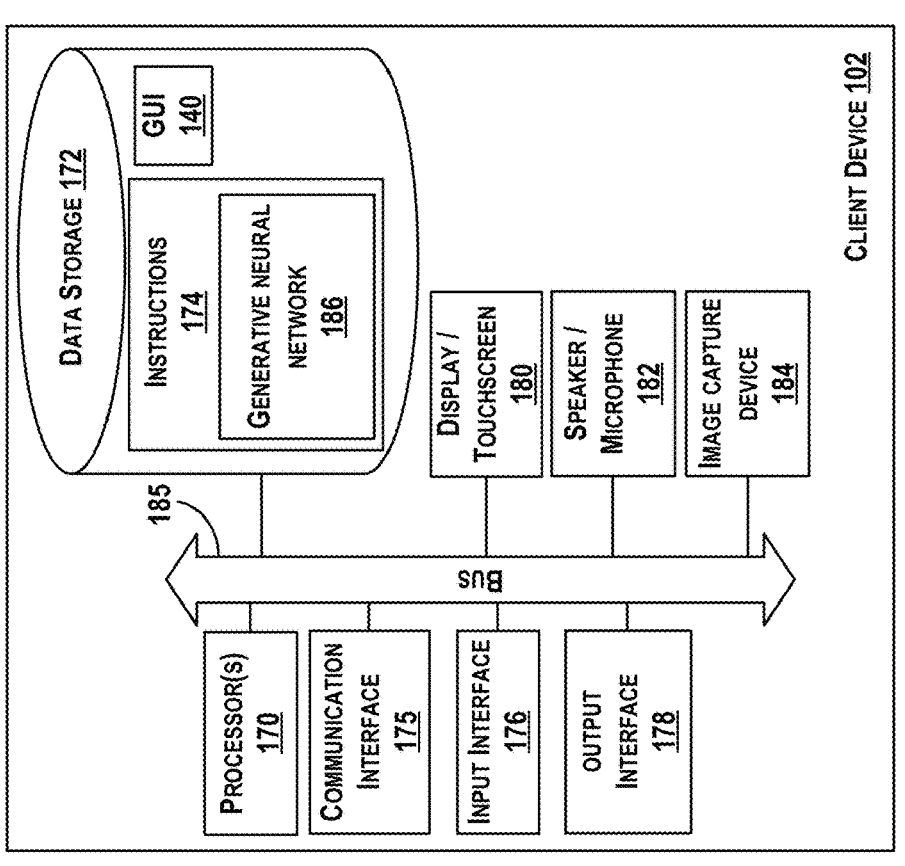
FIG. 5 illustrates a simplified block diagram of the client device, according to an example implementation.

FIG. 5 illustrates a simplified block diagram of the client device 102, according to an example implementation. FIG. 5 does not necessarily show all of the hardware and software modules included in the client device 102, and omits physical and logical connections that will be apparent to one of ordinary skill in the art after review of the present disclosure. Although FIG. 5 illustrates components for the client device 102, the features shown in FIG. 5 are illustrative as components of any client device for use in the networked computer system 100.

The client device 102 includes one or more processor(s) 170, and a non-transitory computer-readable media (data storage) 172 storing instructions 174, which when executed by the one or more processor(s) 170, causes the client device 102 to perform functions (as described below). To perform functions, the client device 102 includes a communication interface 175, an input interface 176, an output interface 178, a display/touchscreen 180, a speaker/microphone 182, and an image capture device 184, and each component of the client device 102 is connected to a communication bus 185. The client device 102 may also include hardware to enable communication within the client device 102 and between the client device 102 and other devices (not shown). The hardware may include transmitters, receivers, and antennas, for example.

The communication interface 175 is a wireless interface and/or one or more wireline interfaces that allow for both short-range communication and long-range communication to one or more networks or to one or more remote devices. Such wireless interfaces provide for communication under one or more wireless communication protocols, Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces include an Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interface 175 is configured to receive input data from one or more devices, and configured to send output data to other devices.

The data storage 172 includes or takes the form of memory, such as one or more computer-readable storage media that can be read or accessed by the one or more processor(s) 170. The computer-readable storage media includes volatile and/or non-volatile storage components, such as optical, magnetic, organic or other memory or disc storage, which can be integrated in whole or in part with the one or more processor(s) 170. The non-transitory data storage 172 is considered non-transitory computer readable media. In some examples, the non-transitory data storage 172 is implemented using a single physical device (e.g., one optical, magnetic, organic or other memory or disc storage unit), while in other examples, the non-transitory data storage 172 is implemented using two or more physical devices. The non-transitory data storage 172 thus is a computer readable medium, and instructions 174 are stored thereon. The instructions 174 include computer executable code.

The one or more processor(s) 170 include a general-purpose processor or special purpose processor (e.g., digital signal processors, application specific integrated circuits, etc.). The one or more processor(s) 170 receives inputs from the communication interface 175 as well as from other components (the display/touchscreen 180, the speaker/microphone 182, or the image capture device 184), and processes the inputs to generate outputs that are stored in the non-transitory data storage 172. The one or more processor(s) 170 are configured to execute the instructions 174 (e.g., computer-readable program instructions) that are stored in the non-transitory data storage 172 and are executable to provide the functionality of the client device 102 described herein.

The input interface 176 is used to enter data or commands and can include, for example, a keyboard, a scanner, a user pointing device such as, for example, a mouse, a trackball, or a touch pad, or may further include the touchscreen or microphone.

The output interface 178 outputs information for reporting or storage, and thus, the output interface 178 may be similar to the communication interface 175 and can be a wireless interface (e.g., transmitter) or a wired interface as well.

The instructions 174 are further shown to include a generative neural network 186. Thus, the instructions 174 are further executable to perform functions of a generative neural network 186, for example. The generative neural network 186 performs functions of generative modeling in an unsupervised learning task in machine learning that involves discovering and learning regularities or patterns in input data in such a way that the model is used to generate or output new examples that plausibly could have been drawn from the original dataset. The generative neural network 186 thus utilizes machine learning using a model to make a prediction, and the machine learning requires a training dataset to train a model comprised of multiple examples each with input variables and output class labels.

In one example, the generative neural network is a generative adversarial network (GAN). A GAN trains a generative model by framing the problem as a supervised learning problem with two sub-models: the generator model trained to generate new examples, and a discriminator model that classifies examples as either real (from the domain) or fake (generated). The two models are trained together in a zero-sum game, adversarial, until the discriminator model is successful about half the time, meaning the generator model is generating plausible examples. The GAN is beneficial, for example, to generate realistic examples across a range of problem domains including image-to-image translation tasks and generating photorealistic outputs.

The generator model takes a fixed-length random vector as input and generates a sample in the domain. The vector is drawn from a Gaussian distribution, and the vector is used to seed the generative process. After training, points in this multidimensional vector space will correspond to points in the problem domain, forming a compressed representation of the data distribution. The vector space is referred to as a latent space, or a vector space comprised of latent variables. Latent variables, or hidden variables, are those variables that are important for a domain but are not directly observable. The latent space provides a compression or high-level concepts of the observed raw data such as the input data distribution. In the case of the GAN, the generator model applies meaning to points in a chosen latent space, such that new points drawn from the latent space can be provided to the generator model as input and used to generate new and different output examples.

Within examples described herein, the generative neural network 186 is utilized to modify a digital image, based on input parameters, to create a modified digital image in which a feature of hair on the person is modified. Details of the modification process are described more fully below.

Figure 6:
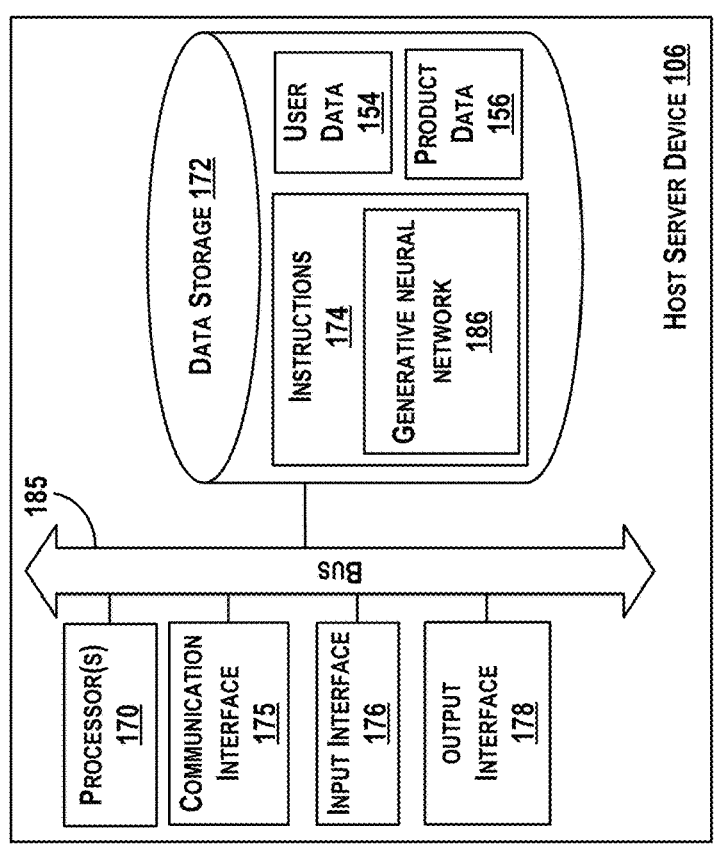
FIG. 6 illustrates a simplified block diagram of the host server device, according to an example implementation.

FIG. 6 illustrates a simplified block diagram of the host server device 106, according to an example implementation. Like the illustration in FIG. 5, FIG. 6 does not necessarily show all of the hardware and software modules included in the host server device 106. Further, similar components illustrated in FIG. 6 that have been described with reference to FIGS. 2-5 are not repeated here.

The host server device 106 can take the form of a server computer, a client computer, a personal computer (PC), a user device, a mobile phone, a tablet, a laptop computer, a set-top box (STB), a thin-client device, or any machine capable of executing a set of instructions (sequential or otherwise) that specify actions to be taken by that machine.

Within one example, in operation, when the instructions 174 are executed by the one or more processor(s) 170 (of the client device 102 or in other examples of the host server device 106, or still in other examples of a combination of the client device 102 and the host server device 106), the one or more processor(s) 170 is caused to perform functions for an image processing method, such as via operation of the image processing platform 130. The functions include receiving a digital image including a face area of a person and a background area (such as from the image processing device 132), receiving an input parameter for modification of a feature of hair on the person (such as from the GUI 140), modifying the digital image based on the input parameter utilizing a generative neural network to create a modified digital image in which the feature of the hair on the person is modified, extracting a hair area from the modified digital image, and the face area and the background area from the digital image, and combining the face area and the background area from the digital image with the hair area from the modified digital image to create a composite modified digital image that includes data representing a modified feature of hair on the person from the modified digital image and data representing the face area and the background area from the digital image.

Figure 7:
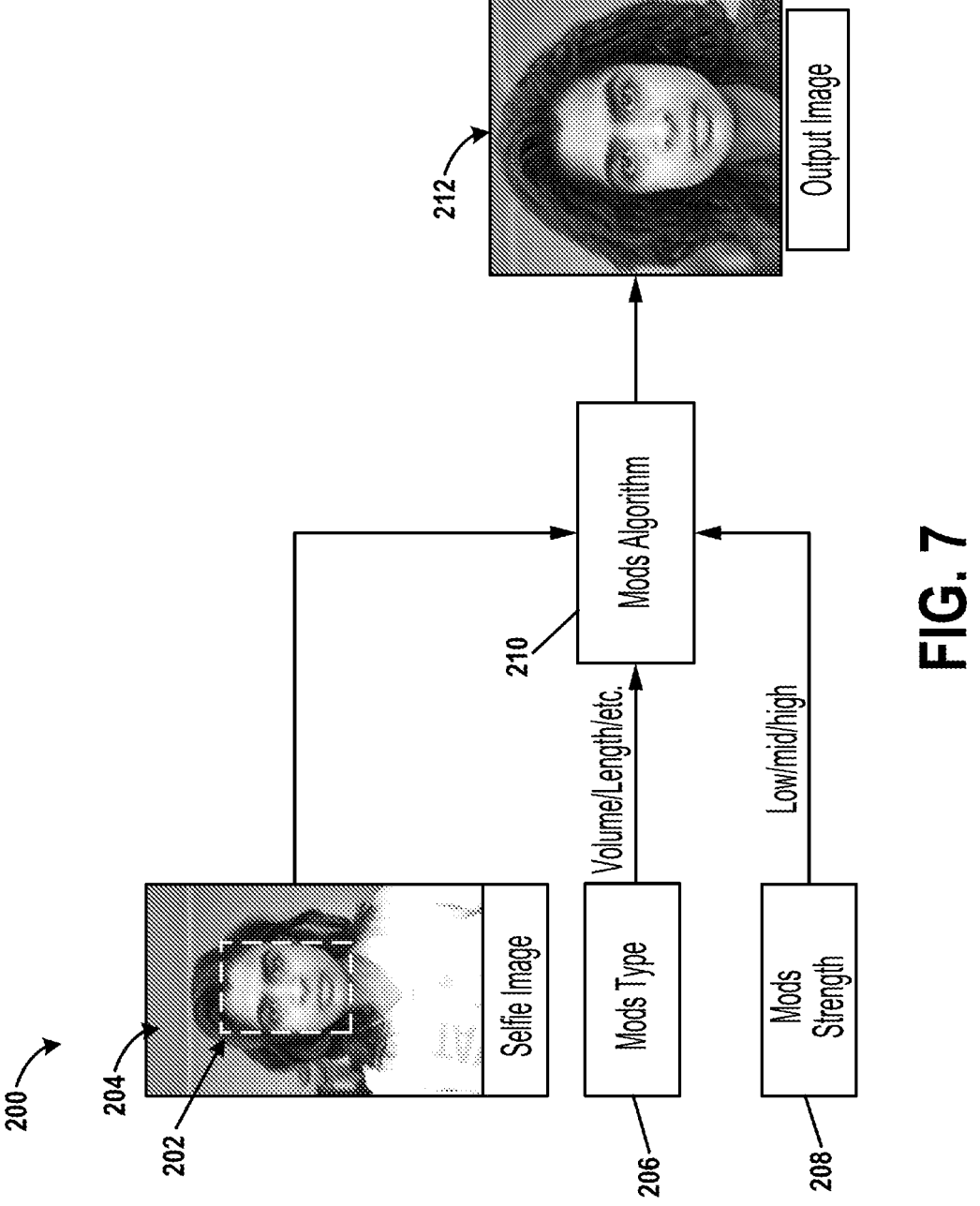
FIG. 7 is a workflow diagram illustrating example functions of the modification type algorithm and the modification strength algorithm, according to an example implementation.

FIG. 7 is a workflow diagram illustrating example functions of the modification type algorithm 144 and the modification strength algorithm 146, according to an example implementation. Generally, the workflow begins with receiving a digital image 200 including a face area 202 of a person and a background area 204. An input parameter is received as well indicating a modification of a feature of hair on the person. In one example, the input parameter is a mods type 206 indicating details for modifying a texture of the hair (e.g., curly/flat), a length of the hair, or a volume of the hair, for example, on the head of the person. In another example, the input parameter also includes a mods strength 208 indicating details for a level or magnitude of modification of the feature, such as low, mid, or high, for example.

Following, a mods algorithm 210 (e.g., the modification type algorithm 144 and the modification strength algorithm 146) is executed to modify the digital image 200 based on the input parameters utilizing a generative neural network to create a modified digital image in which the feature of the hair on the person is modified, and an output image 212 is created by combining the face area 202 and the background area 204 from the digital image 200 with the hair area from the modified digital image to create a composite modified digital image for output that includes data representing a modified feature of hair on the person from the modified digital image and data representing the face area 202 and the background area 204 from the digital image 200.

Figure 8:
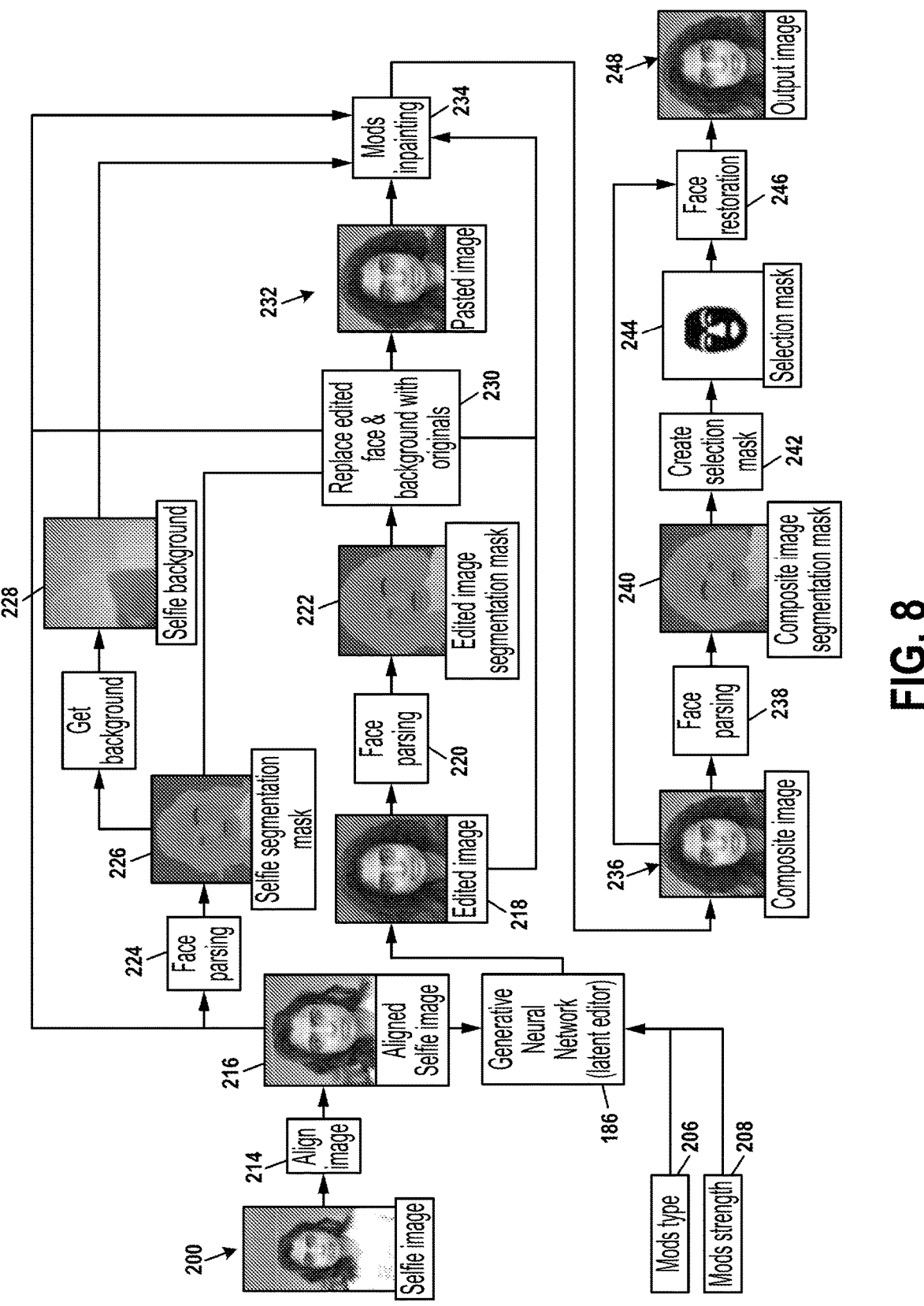
FIG. 8 is a detailed workflow diagram of the functions shown in FIG. 7, according to an example implementation.

FIG. 8 is a detailed workflow diagram of the functions shown in FIG. 7, according to an example implementation. Generally, the workflow begins with receiving the digital image 200 including the face area 202 of a person and the background area 204. An input parameter is received as well indicating a modification of a feature of hair on the person. In one example, the input parameter is the mods type 206 indicating details for modifying a texture of the hair (e.g., curly/flat), a length of the hair, or a volume of the hair, for example, on the head of the person. In another example, the input parameter also includes the mods strength 208 indicating details for a level or magnitude of modification of the feature, such as low, mid, or high, for example. In another example, the input parameter includes an instruction of an area of hair on the person to modify (e.g., on the head, a beard, a mustache, eyebrows, etc.) and indicates the modification of the feature of the hair.

Following, pre-processing of the digital image 200 for at least one of aligning, cropping, and resizing the digital image 200 prior to modifying the digital image 200, as shown at block 214. For example, the digital image 200 is cropped to be of a preset size and aligned such that the face of the person is in a center of the image to create an aligned selfie image 216.

The aligned selfie image 216 is modified, based on the input parameter, by utilizing a generative neural network, such as the generative neural network 186 (e.g., latent editor), to create a modified digital image 218 in which the feature of the hair on the person is modified. To do so, the generative neural network 186 projects the digital image 216 into a latent vector space to create a vector image (e.g., encoding the image into a vector format to convert the image from a pixel domain to a latent space domain), modifies the vector image based on the input parameter to create a modified vector image (such that modifications occur in latent space), and inverts the modified vector image into the modified digital image 218 (e.g., to convert back into the pixel domain). The modifications of the vector image by the generative neural network 186 include usage of a generator model to generate modifications.

In general, the generative neural network 186 operates as an un-supervised learning model with two sub-models: a generator model that is trained to generate new examples, and a discriminator model that tries to classify examples as either real (from the domain) or fake (generated). The two models are trained together in an adversarial manner until the discriminator model is fooled about half the time, meaning the generator model is generating plausible examples. Within examples herein, the generative neural network 186 is trained with images including faces, and after training, new images are received and passed through the generative neural network 186 to understand and determine where in latent space the new image falls (referred as latent space encoding). Continued execution and training of the generative neural network 186 results in regions of latent space created where images are sorted based on hair features like a beard, bald, color, texture, long hair, etc. Each specific region of the latent space in the generative neural network 186 has a common factor. Then, using the generative neural network 186 to perform modifications between latent spaces results in solving the problem of finding a pathway between regions of the latent space.

Usage of the generative neural network 186 can result in an entanglement of independent factors when solving to find the pathway between regions of the latent space. In a specific example, for two images wherein one image has a person with short hair and the other image has a person with long hair, and the generative neural network 186 is executed to modify the short hair image to be a long hair image, such modifications of the image can also result in modifying other features of the image in addition to modifying the hair. When such an unintentional modification of other features occurs, it is commonly referred as entanglement of the results, where other factors become coupled with the changes being made.

A disentanglement process is then required. To achieve disentanglement, the latent space of the generative neural network 186 is desirably sampled with images with all possible variations of the hair features, and thus, large and diverse training image sets result in less entanglement and improved independence to modify each facial feature on its own.

In addition, a large dataset of training images additionally helps with creating accurate composite images for a diverse range of a population and ensures that hairstyles appear equally good across every possible type of hair and face combination. In one example, the training image sets accurately represent diverse samples across a demographic in a representative manner to ensure that accuracy of the generative neural network 236 operates well for all types of hairstyle and face combinations, including for all types of gender, skin color, hair color, face shapes, face characteristics, etc. The large dataset thus increases performance for more accurately representative and photo-realistic output composite images.

Figure 9A:
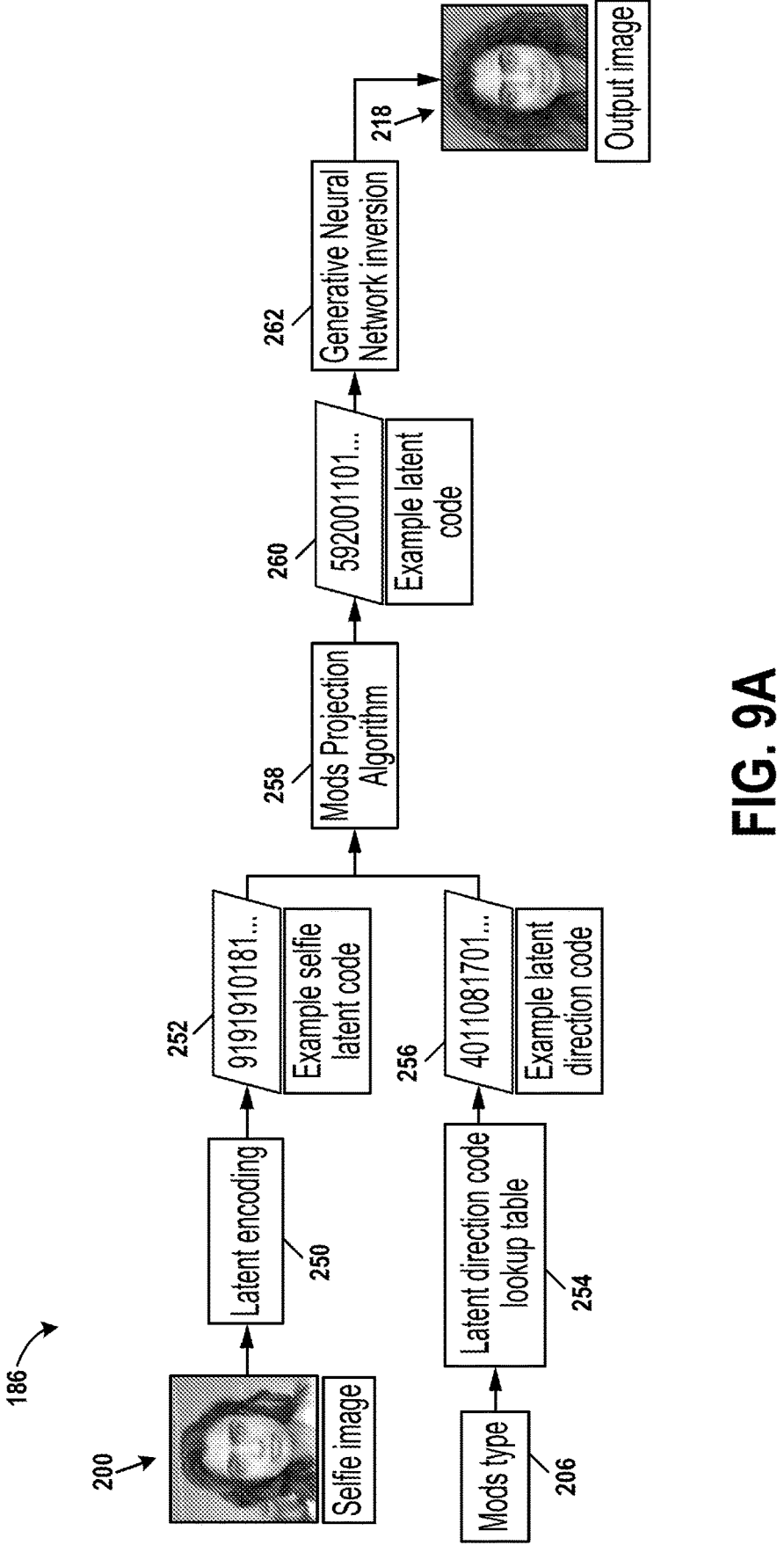
FIG. 9A is a detailed workflow diagram of the functions of the generative neural network shown in FIG. 8, according to an example implementation.

More details of processing by the generative neural network 186 are described with respect to FIG. 9A.

Following, a face parsing 220 is performed creating, for example, a segmentation mask 222 of the edited image to identify location of different parts of face (e.g., neck, eyes, etc.). In one example, a deep neural network is applied for the face parsing 220 to segment the image of a face into semantic components such as, background, hair, body, neck, eyes, nose, mouth, etc.

Functions of the face parsing 220 (commonly referred to as facial semantic segmentation) are performed using a deep learning neural network, which is trained using training images of faces with labeled landmarks and regions. Semantic segmentation aims to label each pixel in an image such that pixels with same labels share certain characteristics. These characteristics can be divided into two categories: low level features (such as color uniformity), and high level features (such as semantic meaning, e.g., this patch of red pixels is a T-shirt). Many deep learning approaches exist for semantic segmentation, and for facial/head segmentation, the task of segmenting different areas of the face/bead (e.g., such as ears, hair, nose, eyes) includes using a set of training data. In one example, each training image includes a pair of RGB images where one is an input (original) selfie image and the other stores corresponding labels. The labels are encoded in pseudo or false color. The labels encode many different areas of the face using RGB labels picked from an indexed colormap, such as [R,G,B]=[0,0,0] is background; [R,G,B]=[255,0,0]=lips; [R,G,B]=[0,255,0] is eyes; [R,G,B]=[255,255,0] is hair, etc. Thus, execution of face parsing 220 results in the segmentation mask 222 with areas of the image associated with the labeled areas of the training images.

In parallel with the processing by the generative neural network 186, face parsing 224 is applied on the aligned selfie image 216 creating a selfie segmentation mask 226. Mask segmentation is performed of (i) the aligned selfie image 216 to segment the face area of the person and the background area 228. In addition, using the edited image segmentation mask 226, a hair area is extracted from the modified digital image 218 (e.g., edited image).

Then, a face area on the modified digital image 218 is replaced with the original selfie face (e.g., with the face area of the person captured from the aligned selfie image 216 using the selfie segmentation mask 226), and a background on the modified digital image 218 is replaced with the selfie background 228 to put back the original background as well, as shown at block 230, to obtain a pasted image 232. When the generative neural network 186 is executed to modify the aligned selfie image 216 in order to create the modified digital image 218 with the modification to the hair, not only is the hair of the person modified but also other features of the digital image become modified due to the latent space changes that occur to the overall digital image. Thus, to restore the modified image back to a photo-realistic view of the person, the changes to a face and background area needs to be reversed. Within examples herein, to reverse those changes, the modified digital image 218 is thus further modified to replace the edited face and background area with the original face and background area. As a result, at block 230, the face area and the background area from the aligned selfie image 216 are combined with the hair area from the modified digital image 218 to create a composite modified digital image, referred to as the pasted image 232 in FIG. 8, that includes data representing a modified feature of hair on the person from the modified digital image 218 and data representing the face area and the background area from the original aligned selfie image 216. Overlays of the portions of the images are performed by mapping to landmarks of identified features in the images.

The functions of block 230 are performed to preserve identity of the person. Rather than executing the generative neural network 186 multiple times to perform many inversions and modifications in an iterative manner until features of the face of an output image are considered close enough to an original image, examples described herein execute the generative neural network 186 one time to perform modifications of hair on the person in the digital image, and then post-processing steps are performed to recover an identity of the person for a photo-realistic view in an output image. In this manner, the workflow is completed in one iteration and execution of the generative neural network 186, and that enables much less processing time to create an output image. Generally, execution of the generative neural network 186 (e.g., a deep neural network) can be a time-consuming process for processors, and thus, one iteration of the generative neural network 186 enables a virtual try-on modification of hair to be performed very quickly (e.g., on the order of seconds).

Following generation of the pasted image 232, a mods inpainting function 234 is performed in which the selfie background 228, and the aligned selfie image 216, and the modified digital image 218 are input to preserve a photo-realistic view of the person and essentially complete missing pieces of the pasted image 232 in order to generate a composite image 236. Details of the mods inpainting function 234 are described more fully in FIG. 11.

Following, another face parsing function 238 is performed on the composite image 236 to generate a new composite image segmentation mask 240, which is used to improve visual quality of a final output image. The workflow creates a selection mask 242, which includes a binary mask (e.g., white vs. black pixels, where white pixels indicate changes have been made as compared to the original digital image), and a face restoration process 246 is performed utilizing the generative neural network to modify the composite image 236 in a way that makes a face look more natural. Thus, face restoration applies a sharpening filter to the composite image 236 to improve contrast and generate an output image 248.

The output image 248 thus includes a face and background of the original input image with modifications to the hair of the person in which the modifications are complete with respect to the head area and represent a photo-realistic view of the person.

FIG. 9A is a detailed workflow diagram of the functions of the generative neural network 236 shown in FIG. 8, according to an example implementation. As mentioned above, initially, the generative neural network 236 projects the modified digital image 232 into a latent vector space to create a vector image and perform latent encoding 250 of the modified digital image 236 to obtain a latent code representation 252 (in FIG. 9A, the latent code representation is an example vector). A latent direction code lookup table 254 is referenced to create a latent direction code 256 most closely matching the image latent code 252. The latent direction code lookup table 254 contains latent codes per different hair types and is described in more detail with respect to FIG. 10.

A mods projection algorithm 258 is then executed to generate an output latent code 260 (described with respect to FIG. 9B). The new output latent code 260 is then fed to the generative neural network, as shown at block 262, to obtain an inverted image in the pixel domain as the edited image 236.

FIG. 9B is a conceptual illustration of a latent space representation of images and determination of a length vector, according to an example implementation. The latent space representation is of images of faces with hair of different lengths characterized as short hair, mid-length hair, and long hair. The images may include many different lengths of hair along a spectrum from short to long, for example, where images of short hair are represented by similar latent codes, images of mid-length hair are represented by similar latent codes, and images of long hair are represented by similar latent codes. Each image, however, varies due to hair and/or faces having different secondary attributes, such as curly, wavy, and different colors of hair as well as female, male, eye colors, skin colors, etc. of faces. In FIG. 9B, latent space representations of images having different attributes are illustrated by different shapes (e.g., circle represents curly, triangle represents female) as shown by the legend in FIG. 9B.

Each grouping of latent space representation of images has a centroid. A latent code direction between two regions of latent space is determined between centroids of the regions. For example, as shown in FIG. 9B, a length vector ($\vec{v}$) can be computed between centroids of the short and long hair image latent spaces.

FIG. 9C is another conceptual illustration of the latent space representation of images and projection of an input image along a latent direction code, according to an example implementation. In one example, for an input image having image latent code $x_i^1$, the mods projection algorithm 258 uses the length vector ($\vec{v}$) as a generic direction latent code to project the image latent code $x_i^1$ in that direction to latent code $x_0$ according to equation:

$$x_0 = x_i + \alpha \vec{v}$$

where $\alpha$ is a weight representing an amount of movement in the direction of the latent code vector (where $\alpha$ varies between 0 and 1 where 0 represents no movement and 1 represents movement in the amount of the vector and along the length of the vector to the centroid region). Such a generic projection contemplates using the latent direction codes between centroid regions.

In another example, because different sub-regions of the latent space have different direction codes from the sub-region to a desired centroid space, a more optimized latent direction code is selected. For instance, in another example as shown in FIG. 9C, for an input image having image latent code $x_i^1$, the mods projection algorithm 258 first calculates distances, such as Euclidean distances, between the image latent code $x_i^1$ (e.g., image latent code 252 in FIG. 9A) and all the latent direction codes from the latent direction code lookup table 254. By comparing the computed distances, a latent direction code that is closest to the image latent code $x_i^1$ is determined, shown as $\vec{v}_1$ in FIG. 9C, and is referred to as the "Mods type" Source Latent Code. In this example, in FIG. 9C, the latent direction code is the length vector $\vec{v}_1$ from short hair to long hair along a direction for females. A Selfie Projection Latent Code is computed by projecting the Selfie Latent Code ($x_i^1$) onto the Direction Latent Code ($\vec{v}_1$) using the projection vector formula noted above.

To illustrate another example of the optimized latent code direction method, FIG. 9C illustrates another input image having image latent code $x_i^2$, the mods projection algorithm 258 first calculates distances, such as Euclidean distances, between the image latent code $x_i^2$ and all the latent direction codes from the latent direction code lookup table 254. By comparing the computed distances, a latent direction code that is closest to the image latent code $x_i^2$ is determined, shown as $\vec{v}_2$ in FIG. 9C. In this example, in FIG. 9C, the latent direction code is the length vector $\vec{v}_2$ from short hair to long hair along a direction for males. A Selfie Projection Latent Code is computed by projecting the Selfie Latent Code ($x_i^2$) onto the Direction Latent Code ($\vec{v}_2$) using the projection vector formula noted above.

Figure 10:
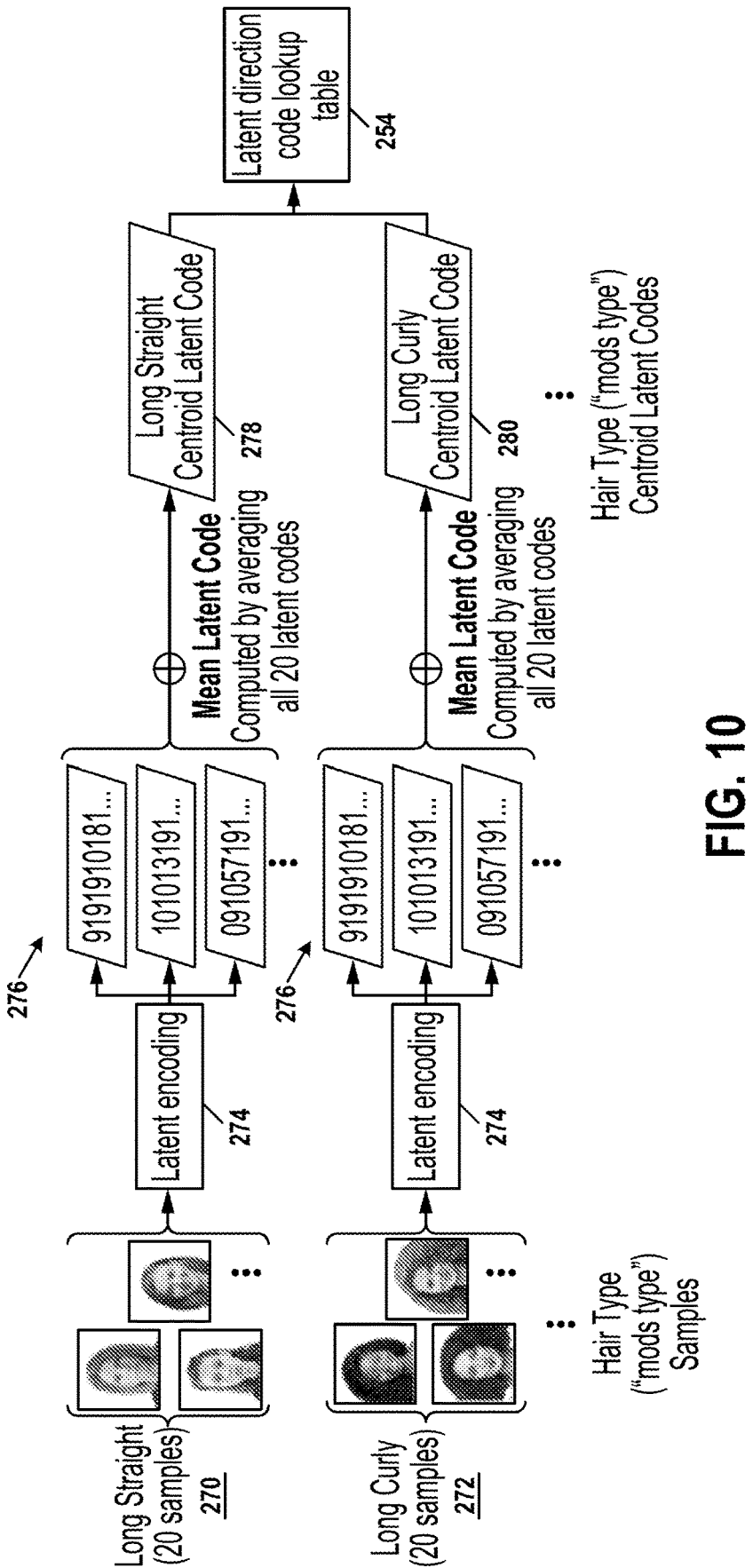
FIG. 10 is a detailed workflow diagram for creation of the latent direction code lookup table as shown in FIG. 9A, according to an example implementation.

FIG. 10 is a detailed workflow diagram for creation of the latent direction code lookup table 254 as shown in FIG. 9A, according to an example implementation. The latent direction code lookup table 254 includes a latent code for every new Mods type 206 to be used. To do so, a dataset of reference images is curated for all mods types, such as a dataset of reference images for long straight hair 270, a dataset of reference images for long curly hair 272, and so on for additional mods types offered. Each dataset of reference images is fed into a generative neural network latent encoder 274 to obtain latent codes 276 for each reference image. A "Mods type" centroid latent code 278 for long straight hair is calculated by averaging all of the latent codes for images from the dataset of reference image for long straight hair 270. Similarly, a "Mods type" centroid latent code 280 for long curly hair is calculated by averaging all of the latent codes for images from the dataset of reference image for long straight hair 272. The latent direction code lookup table 254 is created in a key-value pair format to store the new "Mods type" centroid latent codes, where the name of the "Mods type" is the key and the latent code is the value, for example.

Figure 11:
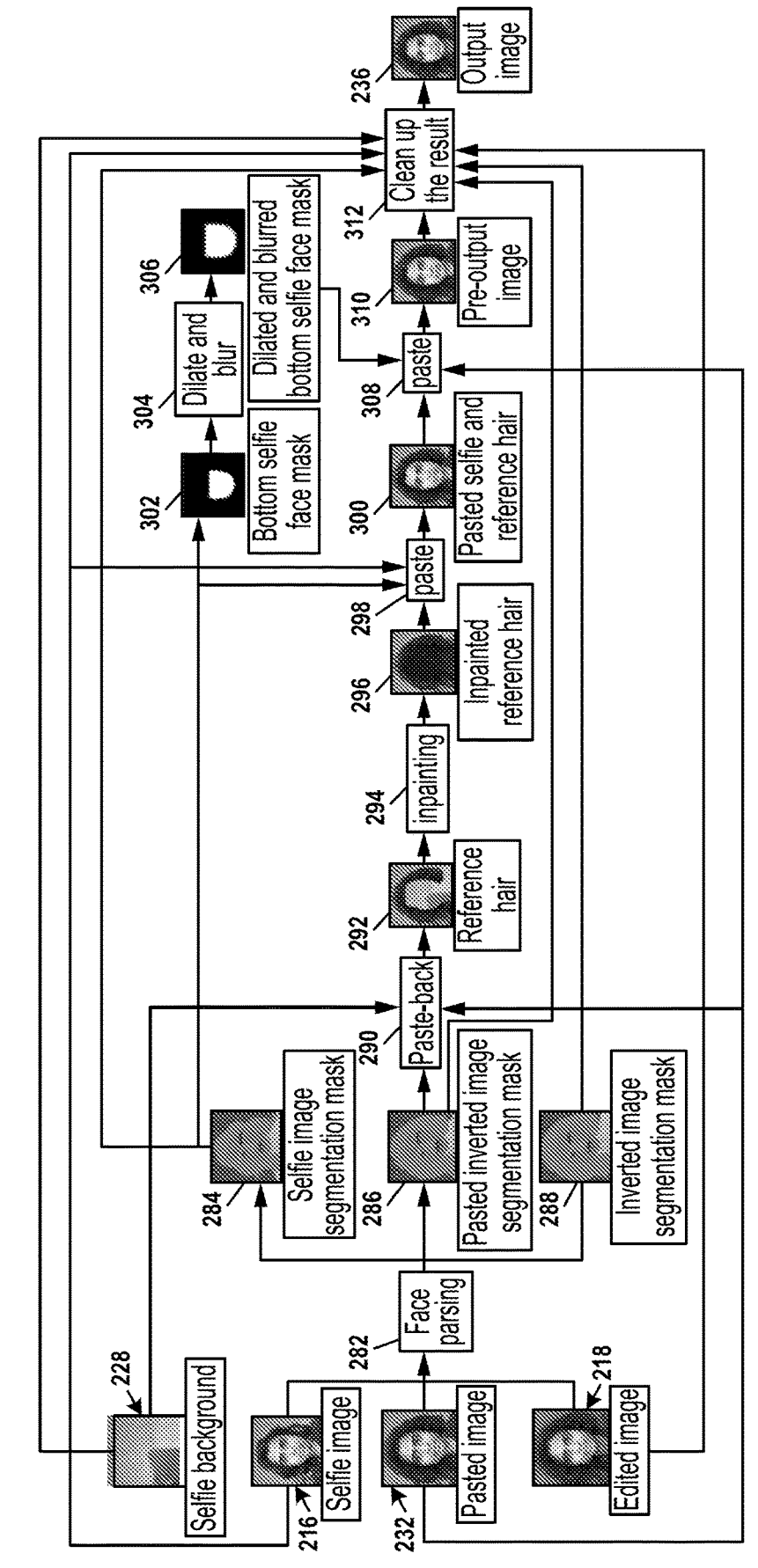
FIG. 11 is a detailed workflow diagram for the mods inpainting function as shown in FIG. 8, according to an example implementation.

FIG. 11 is a detailed workflow diagram for the mods inpainting function 234 as shown in FIG. 8, according to an example implementation. The mods inpainting function 234 receives the selfie background 228, aligned selfie image 216, the modified digital image 218, and the pasted image 232 in order to generate a composite image 236 in which a photo-realistic view of the person is maintained and missing pieces of the pasted image 232 are completed. For example, if hair is modified on the selfie image 216 to be shorter than original hair, there may be missing content in the image that needs to be filled. Thus, based on a comparison of the aligned selfie image 216, the modified digital image 218, and the pasted image 232, the mods inpainting function 234 is executed to fill in an area of the modified feature of hair within the hair area extracted from the modified digital image 218, and preserves an identity of the person for a photo-realistic view of the person in the composite image 236.

The mods inpainting function 234 uses masks to detect where hair was present in the selfie image 216 and is not now present in the pasted image 232, or where there was not hair present in the selfie image 216 and there is now hair present in the pasted image 232 to detect areas (holes) needing completions in the digital image. Thus, image processing is used to paste-back hair of the pasted Image 232 onto the selfie background 228, guided by segmentation masks. For example, face parsing 282 is applied to the input images to perform segmentation of the selfie image 216 (to create a selfie image segmentation mask 284), segmentation of the pasted image 232 (to create a pasted inverted image segmentation mask 286), and segmentation of the modified digital image 218 (to create an inverted image segmentation mask 288).

Using the masks applied to the input images, the background area and the modified feature of hair are segmented, as shown at block 290, into a reference hair image 292 that includes the modified feature of the hair. The paste-back block 290 further includes usages of segmentation masks to output the reference hair image 292 that includes pasted hair and no face (e.g., region to be filed in) for input to inpainting. Segmentation mask creation and usage is the same functionality as described above for face parsing in FIG. 8, for example.

Inpainting at block 294 is performed to digitally fill in an area of the modified feature of hair within the reference hair image 292 to create an inpainted reference hair image 296. Following, the face area of the person from the selfie image 216 is pasted (overlaid) into the reference hair image for a pasted reference hair image 300. In one example, a deep neural network is used for inpainting hair on the image, where the hair would be behind the head.

Next, image processing is applied to extract and blur a bottom of the selfie image segmentation mask 284 by creating a bottom selfie face mask 302, and then dilating and blurring the mask 302 (as shown at block 304) to create a dilated and blurred bottom selfie face mask 306 that is used to overlay a bottom part of the face from the selfie image 216 with a bottom part of the face from the pasted image 232. This overlay is performed to position a forehead and hairline area from the pasted image 232 into the pasted reference hair image 300, as shown at block 308, to create a pre-output image 310 that reduces presence of artifacts.

In the pasted image 232, clothing of the person may have been modified, such as to insert a digital black t-shirt for example. Thus, within the output image 236, it is desirable to include a real item of clothing, and if possible, to use content from the selfie image 216 to return to an original t-shirt. Whether the content of the selfie image 216 for clothing can be used is dependent upon changes and modifications made to hair of the person. As a result, a next function includes clean-up the pre-output image 310 (as shown at block 312), such as by modifying the pre-output image 310 to include clothing based on a length of hair in the selfie image 216 in relation to a shoulder area of the person or modifying the pre-output image 310 to include clothing based on occlusion of hair in the selfie image 216 in relation to the person. As an example, when hair overlaps shoulders in the pre-output image 310, the pre-output image 310 is modified to replace any shirt with a digital representation of a black t-shirt.

Figures 12, 13, 14, 15, 16, 17:
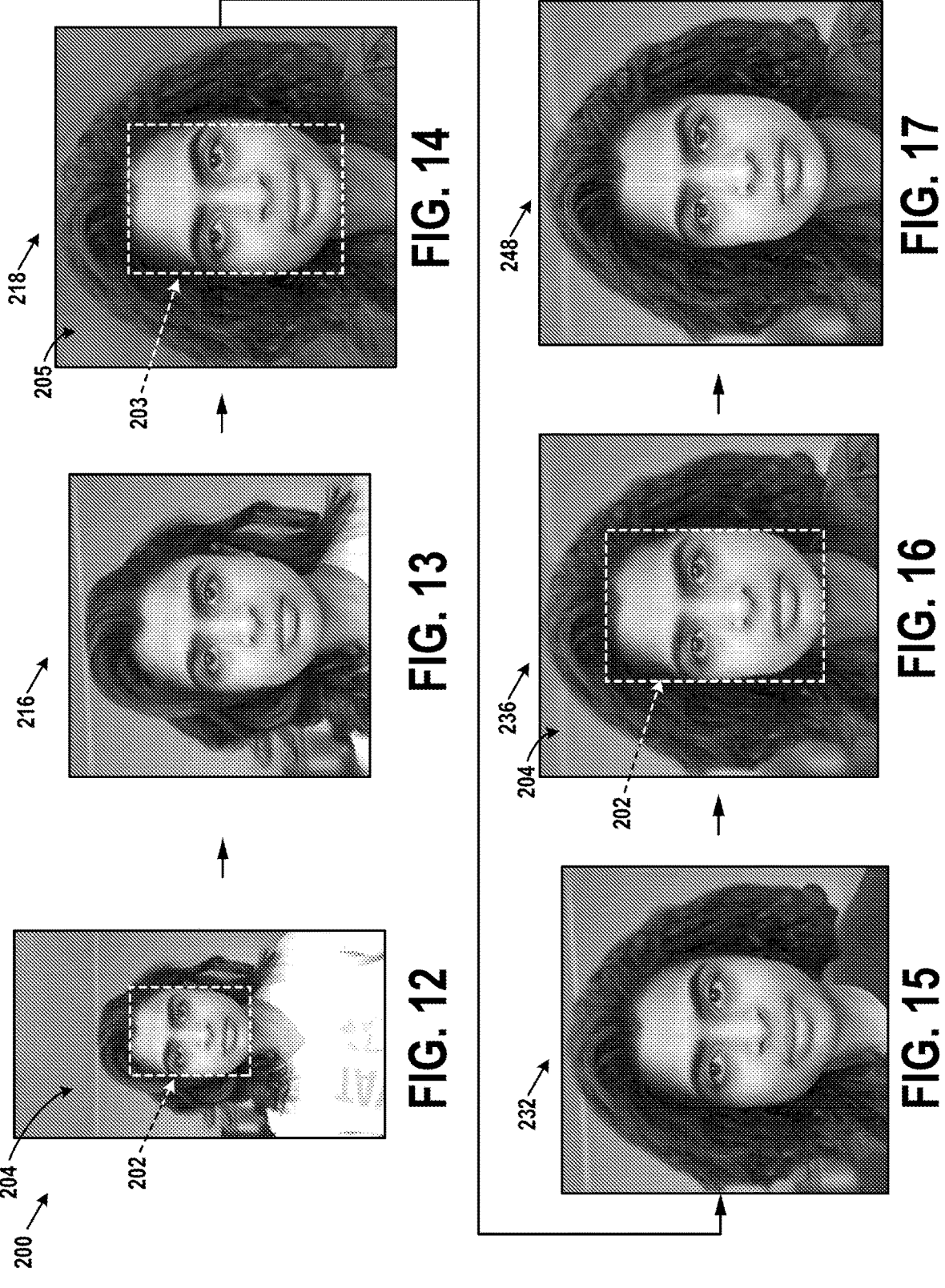
FIGS. 12-17 are example digital image representations illustrating step-wise modifications made to the images to perform functions shown in FIG. 8, according to an example implementation

FIGS. 12-17 are example digital image representations illustrating step-wise modifications made to the images to perform functions shown in FIG. 8, according to an example implementation. FIG. 12 illustrates the digital image 200 including the face area 202 of the person and the background area 204 is received. FIG. 13 illustrates that pre-processing of the digital image 200 for at least one of aligning, cropping, and resizing the digital image 200 is performed such that the digital image 200 is cropped to be of a preset size and aligned such that the face of the person is in a center of the image to create the aligned selfie image 216.

FIG. 14 illustrates that the aligned selfie image 216 is modified, based on the input parameter, by utilizing the generative neural network 186 (e.g., latent editor), to create the modified digital image 218 in which the feature of the hair on the person is modified. Thus, as shown in the modified digital image 218, the hair has more volume and is modified in many ways, and when the generative neural network 186 performs latent space modifications to the aligned selfie image 216, all aspects of the selfie image 216 are modified. Thus, a face area 203 in the modified digital image 218 is modified from an original look of the face area 202 in the aligned selfie image 216. A background area 205 in the modified digital image 218 is also modified from an original look of the background area 204 in the aligned selfie image 216

As a result, next functions include replacing the background area 205 on the modified digital image 218 with the background area 204 of the aligned selfie image 216 to put back the original background to obtain the pasted image 232, as shown in FIG. 15. Similarly, next functions include replacing the face area 203 on the modified digital image 218 with the original selfie face (e.g., with the face area 202 of the person captured from the aligned selfie image 216) to put back the original face as well to obtain the composite image 236, as shown in FIG. 16. The mods inpainting function is also performed to complete missing pieces of the pasted image 232 in order to generate the composite image 236.

Next, face restoration applies a sharpening filter to the composite image 236 to improve contrast and generate the output image 248, as shown in FIG. 17. Functions of the sharpening filter are performed, for example, using a classical unsharpen image processing technique or deep learning neural network computations. The output image 248 thus includes the face and background of the original input image with modifications to the hair of the person in which the modifications are complete with respect to the head area and represent a photo-realistic view of the person.

Figure 18:
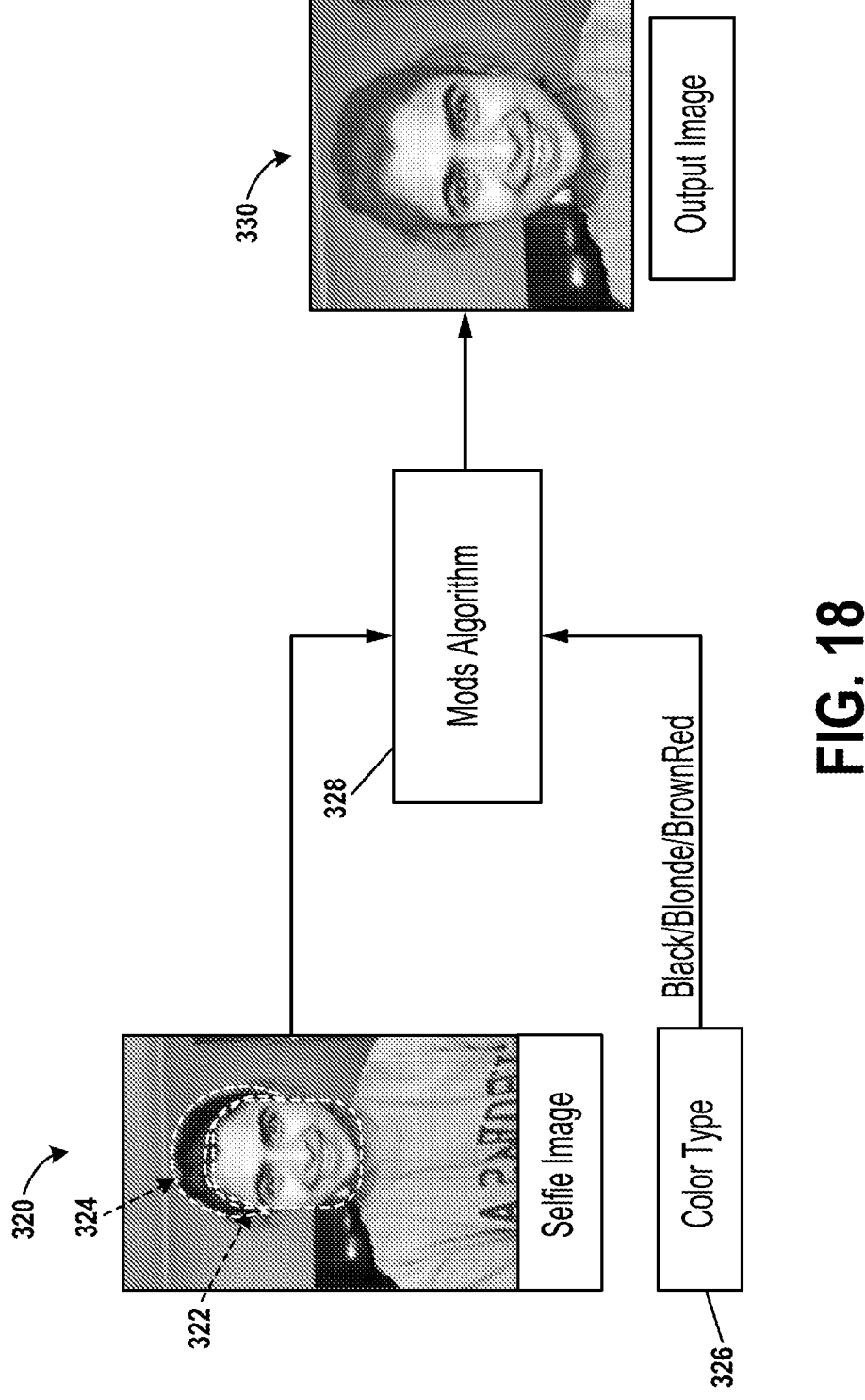
FIG. 18 is a workflow diagram illustrating example functions of the modification type algorithm for changing color of features in a digital image, according to an example implementation

FIG. 18 is a workflow diagram illustrating example functions of the modification type algorithm 144 for changing color of features in a digital image, according to an example implementation. Generally, the workflow begins with receiving a digital selfie image 320 including a face area 322 of a person and a hair area 324. An input parameter is received as well indicating a modification of a feature of hair on the person. In one example, the input parameter is a color type 326 indicating details for modifying a color of the hair.

Following, a mods algorithm 328 (e.g., the modification color algorithm 148) is executed to modify the digital selfie image 320 based on the input parameter to create a modified digital image in which the feature of the hair on the person is modified, and an output image 330 is created with the color of the hair changed.

Figure 19:
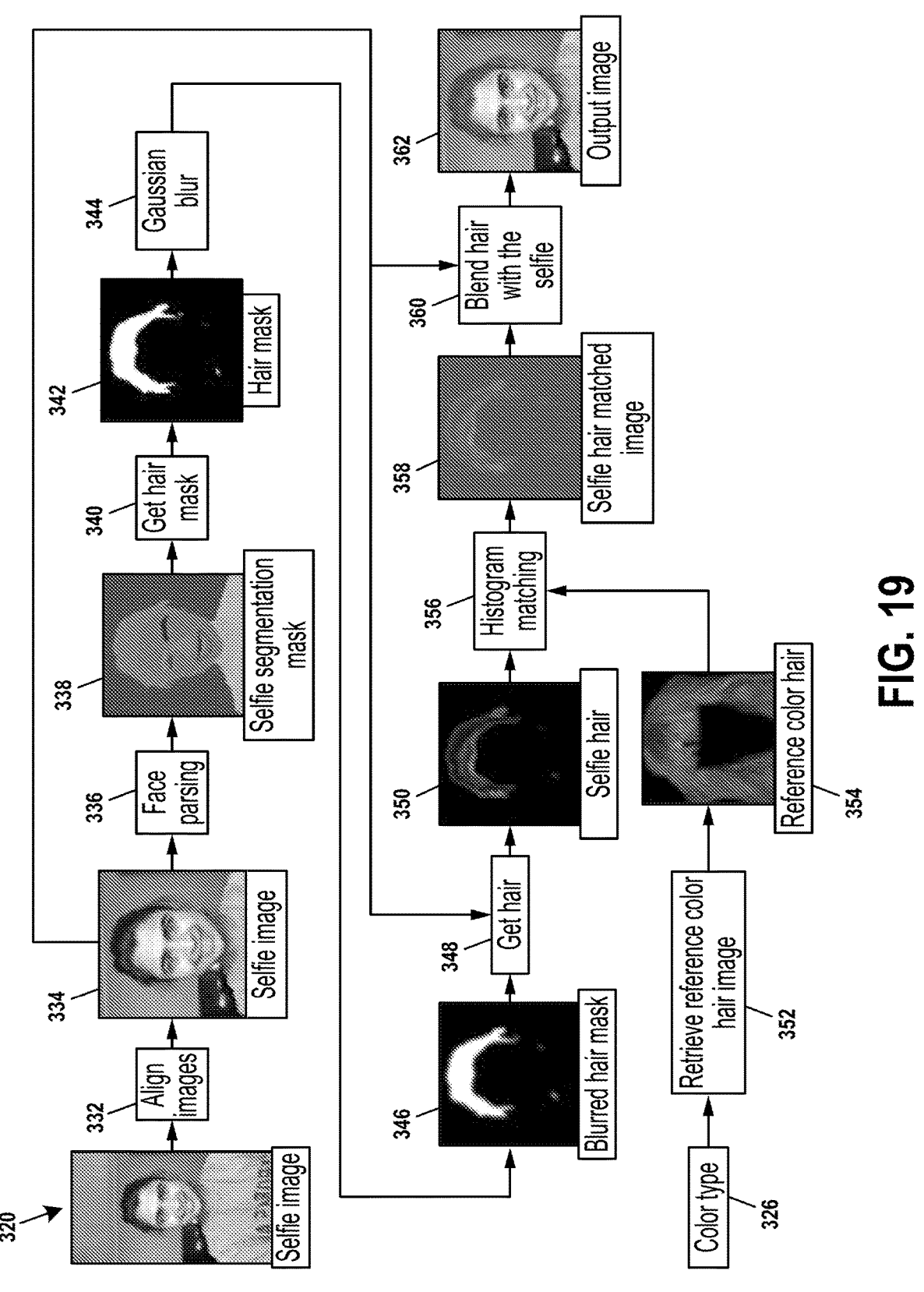
FIG. 19 is a detailed workflow diagram of the functions shown in FIG. 18, according to an example implementation.

FIG. 19 is a detailed workflow diagram of the functions shown in FIG. 18, according to an example implementation. Generally, the workflow begins by receiving the selfie image 320 and the color type 326. Similar to the workflow described above in FIG. 8, pre-processing of the selfie image

320 is performed for at least one of aligning, cropping, and resizing the digital image 200, as shown at block 332 to create an aligned selfie image 334. Then face parsing 336 is performed on the aligned selfie image 334 to generate a selfie segmentation mask 338, from which functions are performed to get hair mask 340 so as to obtain a hair mask 342 of the hair only. Note that face parsing 336 includes execution of the same or similar functions as face parsing described above in FIG. 8.

The hair mask 342 has a low pass filtering 344 applied to generate a hair mask with soft transitions (e.g., blurred boundaries) 346. One example to achieve low pass filtering on images is the Gaussian Blur 344, which includes, for example, usage of low pass filter, to smooth mask transition, and an amount of filtering is a dynamically adapted parameter that adjusts to a size of a facial feature being processed. For example, the Gaussian blur 344, for each pixel undergoing processing, determines an average color of pixels in a neighborhood (e.g., defined as nine neighbors for a (3×3) neighborhood) and modifies a color of the pixel to the average color. A size of the neighborhood can be configured accordingly, such as based on a size of the image, to adjust the filtering. The Gaussian blur 344 thus causes a transition from hair to background to be smooth, in contrast to a discrete black/white transition.

Following, the blurred hair mask 346 is applied to the aligned selfie image 334 to get hair at block 348, which results in a selfie hair image 350 where hair from the selfie image 320 is in black color.

In parallel, for example, the workflow includes receiving the color type 326 and retrieving a reference color hair image 354, at block 352, having hair of the desired color.

Then, the reference color hair image 354 is applied to the selfie hair image 350 utilizing a histogram matching process 356 to create a modified digital image having the desired color profile (e.g., a gamut of colors) of the reference color hair image 354. The histogram matching process 356 modifies values of pixels of the selfie hair image 350 to be values corresponding to color of the hair in the reference color hair image 354. The histogram matching process 356 plots for each red, green, and blue channel of the selfie hair image 350 and the reference color hair image 354, a histogram and a cumulative histogram, and a matched image (e.g., modified selfie hair image 350 to the color of the reference color hair image 354) has the same cumulative histogram as the reference color hair image 354 for each channel. An output of the histogram matching process 356 is a selfie hair matched image 358 in which an entire image has pixel values matching to a color of the reference color hair image 354.

Next, the selfie hair matching image 358 is blended with the aligned selfie image 334, as shown at block 360, to obtain an output image 362 that is the aligned selfie image 334 modified such that hair on the person is a color of the reference color hair image 354.

Within examples herein, functions of the workflows shown in FIGS. 7-11 and FIGS. 18-19 are performed by the client device 102, by the host server device 106, or by a combination of the client device 102 and the host server device 106.

FIG. 20 is a flowchart illustrating an example of a computer-implemented image processing method 400, according to an example implementation. Method 400 shown in FIG. 20 presents an example of a method that could be used with or performed by the networked computer system 100, the client devices 102 and 104, and/or the host server device(s) 106 shown in FIG. 1 or the image processing platform 130 shown in FIGS. 2-4, or any combination thereof, for example. Method 400 also presents an example of functions to be performed to generate outputs for display by the GUI 140.

Within examples, devices or systems described herein are used or configured to perform logical functions presented in FIG. 20. In some instances, components of the devices and/or systems are configured to perform the functions such that the components are actually configured and structured (with hardware and/or software) to enable such performance. In other examples, components of the devices and/or systems are arranged to be adapted to, capable of, or suited for performing the functions, such as when operated in a specific manner. Method 400 includes one or more operations, functions, or actions as illustrated by one or more of blocks 402-410. Although the blocks are illustrated in a sequential order, these blocks may also be performed in parallel, and/or in a different order than those described herein. In addition, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium includes non-transitory computer readable medium or memory, for example, such as computer-readable media that stores data for short periods of time like register memory, processor cache and Random Access Memory (RAM). The computer readable medium additionally or alternatively includes non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 20, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 402, the method 400 includes receiving a digital image including a face area of a person and a background area.

At block 404, the method 400 includes receiving an input parameter for modification of a feature of hair on the person. In one example, block 404 includes receiving a modification request for at least one of a texture of the hair, a length of the hair, a volume of the hair, and a color of the hair. Within an additional example, block 404 further comprises receiving an instruction of an area of hair on the person to modify, and the input parameter indicates the modification of the feature of the hair. For example, the instruction indicates hair on top of the head, hair on face (beard, mustache), or eyebrows.

At block 406, the method 400 includes modifying the digital image based on the input parameter utilizing a generative neural network to create a modified digital image in which the feature of the hair on the person is modified. In one example, block 406 includes modifying, by a processor utilizing a generative neural network, the digital image based on the input parameter. In another example, block 406 includes projecting the digital image into a latent vector space to create a vector image, modifying the vector image based on the input parameter utilizing the generative neural network to create a modified vector image, and inverting the modified vector image into the modified digital image.

The generative neural network is a GAN, in some examples. In other examples, the generative neural network includes other forms of a deep neural network, whether in a form of software machine learning algorithms executable by a processor, or in a form of networked computer components, for example.

At block 408, the method 400 includes extracting a hair area from the modified digital image, and the face area and the background area from the digital image. In one example, block 408 includes performing mask segmentation of (i) the digital image to segment the face area of the person and the background area and of (ii) the modified digital image to segment the hair area.

At block 410, the method 400 includes combining the face area and the background area from the digital image with the hair area from the modified digital image to create a composite modified digital image that includes data representing a modified feature of hair on the person from the modified digital image and data representing the face area and the background area from the digital image.

Within examples, the method 400 also includes performing pre-processing of the digital image for at least one of aligning, cropping, and resizing the digital image prior to modifying the digital image utilizing the generative neural network.

Within examples, the method 400 also includes based on a comparison of the digital image, the modified digital image, and the composite modified digital image, restoring the composite modified digital image to a photo-realistic view.

Within examples, the method 400 also includes inpainting the composite modified digital image to preserve a photo-realistic view of the person. Inpainting includes comparing the digital image, the modified digital image, and the composite modified digital image, and filling in an area of the modified feature of hair within the hair area extracted from the modified digital image, and then preserving an identity of the person for a photo-realistic view of the person in the composite modified digital image. In other examples, inpainting includes performing segmentation of the composite modified digital image to segment the background area and the modified feature of hair into a reference hair image, digitally filling in an area of the modified feature of hair within the reference hair image, and positioning the face area of the person from the digital image into the reference hair image for a pasted reference hair image. In addition, inpainting further includes using a face segmenting mask, positioning a forehead and hairline area from the composite modified digital image into the pasted reference hair image to create a pre-output image, for example. Within still other examples, inpainting includes modifying the pre-output image to include clothing based on a length of hair in the digital image in relation to a shoulder area of the person, and/or modifying the pre-output image to include clothing based on occlusion of hair in the digital image in relation to the person.

Within examples, the method 400 also includes applying a sharpening filter to the composite modified digital image.

Within further examples, the method 400 also includes receiving the input parameter for a desired color of hair, and then retrieving a reference color hair image having hair of the desired color, and applying the reference color hair image to the digital image utilizing a histogram matching process to create the modified digital image having the desired color of the reference color hair image.

Using example methods, devices, and systems described herein enables a photorealistic output image modified such that features of the hair are changed as instructed. The methods utilize a single pipeline and single execution of the generative neural network to preserve identity of the person by blending the hairline and the forehead of the generative neural network-inverted image with the original selfie, for example.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples describe different advantages as compared to other advantageous examples. The example or examples selected are chosen and described to explain the principles of the examples, the practical application, and to enable others of ordinary skill in the art to understand the disclosure for various examples with various modifications as are suited to the particular use contemplated.

Having described the subject matter of the present disclosure in detail and by reference to specific examples thereof, it is noted that the various details disclosed herein should not be taken to imply that these details relate to elements that are essential components of the various examples described herein, even in cases where a particular element is illustrated in each of the drawings that accompany the present description. Further, it will be apparent that modifications and variations are possible without departing from the scope of the present disclosure, including, but not limited to, examples defined in the appended claims. More specifically, although some aspects of the present disclosure are identified herein as preferred or particularly advantageous, it is contemplated that the present disclosure is not necessarily limited to these aspects.

Moreover, while some examples have been described in the context of fully functioning computers and computer systems, those skilled in the art will appreciate that various examples are capable of being distributed as a program product in a variety of forms, and that the disclosure applies equally regardless of a particular type of machine or computer-readable media used to effect the distribution.

Further examples of machine-readable storage media, machine-readable media, or computer-readable (storage) media include, but are not limited to, recordable type media such as volatile and non-volatile memory devices, floppy and other removable drives, hard drives, optical disks (e.g., Compact Disk Read-Only Memory (CD ROMS), Digital Versatile Disks, (DVDs), etc.), among others, and transmission type media such as digital and analog communication links.

For the purposes of describing and defining examples herein, it is noted that terms "substantially" or "about" are utilized herein to represent an inherent degree of uncertainty attributed to any quantitative comparison, value, measurement, or other representation. The terms "substantially" and "about," when utilized herein, represent the degree by which a quantitative representation may vary from a stated reference without resulting in a change in a basic function of the subject matter at issue.

What is claimed is:

1. A computer-implemented image processing method, comprising:
    receiving an original digital image including a face area of a person and a background area;
    receiving an input parameter for modification of a feature of hair on the person;
    modifying the original digital image based on the input parameter utilizing a generative neural network to create a modified digital image in which the feature of the hair on the person is modified and a portion of the face area and the background area is modified;
    extracting a hair area from the modified digital image, and the face area and the background area from the original digital image; and
    replacing a portion of modified face and background areas of the modified digital image with the face area and the background area from the original digital image to create a composite modified digital image that includes (i) data representing a modified feature of hair on the person as extracted from the modified digital image and (ii) data representing the face area and the background area as extracted from the original digital image.

2. The method of claim 1, wherein receiving the input parameter for modification of the feature of hair on the person comprises receiving a modification request for at least one of a texture of the hair, a length of the hair, a volume of the hair, and a color of the hair.

3. The method of claim 1, further comprising:
    receiving an instruction of an area of hair on the person to modify, wherein the input parameter indicates the modification of the feature of the hair.

4. The method of claim 1, further comprising:
    performing pre-processing of the original digital image for at least one of aligning, cropping, and resizing the original digital image prior to modifying the original digital image utilizing the generative neural network.

5. The method of claim 1, wherein modifying the original digital image based on the input parameter utilizing the generative neural network comprises:
    modifying, by a processor utilizing a generative adversarial network (GAN), the original digital image based on the input parameter.

6. The method of claim 1, wherein modifying the original digital image based on the input parameter utilizing the generative neural network to create the modified digital image in which the feature of the hair on the person is modified comprises:

projecting the original digital image into a latent vector space to create a vector image;
modifying the vector image based on the input parameter utilizing the generative neural network to create a modified vector image; and
inverting the modified vector image into the modified digital image.

7. The method of claim 1, wherein extracting the hair area from the modified digital image, and the face area and the background area from the original digital image comprises:
    performing mask segmentation of (i) the original digital image to segment the face area of the person and the background area and of (ii) the modified digital image to segment the hair area.

8. The method of claim 1, further comprising:
    based on a comparison of the original digital image, the modified digital image, and the composite modified digital image, restoring the composite modified digital image to a photo-realistic view.

9. The method of claim 1, further comprising:
    inpainting the composite modified digital image to preserve a photo-realistic view of the person.

10. The method of claim 9, wherein inpainting the composite modified digital image comprises:
    based on a comparison of the original digital image, the modified digital image, and the composite modified digital image, filling in an area of the modified feature of hair within the hair area extracted from the modified digital image; and
    preserving an identity of the person for a photo-realistic view of the person in the composite modified digital image.

11. The method of claim 9, wherein inpainting the composite modified digital image comprises:
    performing segmentation of the composite modified digital image to segment the background area and the modified feature of hair into a reference hair image;
    filling in an area of the modified feature of hair within the reference hair image; and
    positioning the face area of the person from the original digital image into the reference hair image for a pasted reference hair image.

12. The method of claim 11, further comprising:
    using a face segmenting mask, positioning a forehead and hairline area from the composite modified digital image into the pasted reference hair image to create a pre-output image.

13. The method of claim 12, further comprising:
    modifying the pre-output image to include clothing based on a length of hair in the original digital image in relation to a shoulder area of the person.

14. The method of claim 12, further comprising:
    modifying the pre-output image to include clothing based on occlusion of hair in the original digital image in relation to the person.

15. The method of claim 1, further comprising:
    applying a sharpening filter to the composite modified digital image.

16. The method of claim 1, wherein receiving the input parameter for modification of the feature of hair on the person comprises receiving the input parameter for a desired color of hair, and the method further comprises:
    retrieving a reference color hair image having hair of the desired color; and
    wherein modifying the original digital image based on the input parameter utilizing the generative neural network to create the modified digital image in which the feature of the hair on the person is modified comprises applying the reference color hair image to the original digital image utilizing a histogram matching process to create the modified digital image having the desired color of the reference color hair image.

17. A non-transitory computer-readable media having stored therein executable instructions, which when executed by a system including one or more processors causes the system to perform functions comprising:

receiving an original digital image including a face area of a person and a background area;

receiving an input parameter for modification of a feature of hair on the person;

modifying the original digital image based on the input parameter utilizing a generative neural network to create a modified digital image in which the feature of the hair on the person is modified and a portion of the face area and the background area is modified;

extracting a hair area from the modified digital image, and the face area and the background area from the original digital image; and replacing a portion of modified face and background areas of the modified digital image with the face area and the background area from the original digital image to create a composite modified digital image that includes (i) data representing a modified feature of hair on the person as extracted from the modified digital image and (ii) data representing the face area and the background area as extracted from the original digital image.

18. The non-transitory computer-readable media of claim 17, wherein the functions further comprise:

based on a comparison of the original digital image, the modified digital image, and the composite modified digital image, restoring the composite modified digital image to a photo-realistic view.

19. A system comprising:

one or more processors and non-transitory computer-readable media having stored therein instructions, which when executed by the one or more processors, causes the system to perform functions comprising:

receiving an original digital image including a face area of a person and a background area;

receiving an input parameter for modification of a feature of hair on the person;

modifying the original digital image based on the input parameter utilizing a generative neural network to create a modified digital image in which the feature of the hair on the person is modified and a portion of the face area and the background area is modified;

extracting a hair area from the modified digital image, and the face area and the background area from the original digital image; and replacing a portion of modified face and background areas of the modified digital image with the face area and the background area from the original digital image to create a composite modified digital image that includes (i) data representing a modified feature of hair on the person as extracted from the modified digital image and (ii) data representing the face area and the background area as extracted from the original digital image.

20. The system of claim 19, wherein the functions further comprise:

inpainting the composite modified digital image to preserve a photo-realistic view of the person.

*    *    *    *    *